(12) United States Patent
Hoelen et al.

(10) Patent No.: US 8,567,974 B2
(45) Date of Patent: Oct. 29, 2013

(54) ILLUMINATION DEVICE WITH LED AND ONE OR MORE TRANSMISSIVE WINDOWS

(75) Inventors: Christoph Gerard August Hoelen, Eindhoven (NL); Josephus Paulus Augustinus Deeben, Eindhoven (NL); George Hubert Borel, Venlo (NL); Vicky Lammens, Eindhoven (NL); Matthijs Hendrik Keuper, Eindhoven (NL); Rene Theodorus Wegh, Eindhoven (NL); Lars Rene Christian Waumans, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 400 days.

(21) Appl. No.: 12/918,546

(22) PCT Filed: Feb. 23, 2009

(86) PCT No.: PCT/IB2009/050718
§ 371 (c)(1),
(2), (4) Date: Aug. 20, 2010

(87) PCT Pub. No.: WO2009/107052
PCT Pub. Date: Sep. 3, 2009

(65) Prior Publication Data
US 2010/0328926 A1 Dec. 30, 2010

(51) Int. Cl.
F21V 9/16 (2006.01)
(52) U.S. Cl.
USPC ............. 362/84; 362/235; 362/307; 313/498; 313/503

(58) Field of Classification Search
USPC ............. 362/84, 307, 310, 235; 313/498–512
See application file for complete search history.

(56) References Cited

U.S. PATENT DOCUMENTS

| | | | |
|---|---|---|---|
| 6,517,213 B1 * | 2/2003 | Fujita et al. | 362/84 |
| 6,635,363 B1 | 10/2003 | Duclos et al. | |
| 7,052,152 B2 | 5/2006 | Harbers et al. | |
| 7,224,000 B2 | 5/2007 | Aanegola et al. | |
| 7,260,123 B2 | 8/2007 | Sato | |
| 2004/0145895 A1 * | 7/2004 | Ouderkirk et al. | 362/260 |
| 2004/0257797 A1 * | 12/2004 | Suehiro et al. | 362/34 |
| 2005/0269582 A1 | 12/2005 | Mueller et al. | |
| 2006/0007553 A1 | 1/2006 | Bogner et al. | |
| 2006/0034084 A1 * | 2/2006 | Matsuura et al. | 362/293 |
| 2006/0124953 A1 | 6/2006 | Negley et al. | |
| 2006/0132011 A1 * | 6/2006 | Shimizu et al. | 313/112 |
| 2007/0075306 A1 * | 4/2007 | Hayashi et al. | 257/13 |
| 2007/0114562 A1 | 5/2007 | Radkov et al. | |
| 2007/0120135 A1 | 5/2007 | Soules et al. | |

(Continued)

FOREIGN PATENT DOCUMENTS

| | | |
|---|---|---|
| WO | 2004021461 A2 | 3/2004 |
| WO | 2005083036 A1 | 9/2005 |
| WO | 2007007236 A2 | 1/2007 |
| WO | 2007052777 A1 | 5/2007 |

Primary Examiner — Britt D Hanley
Assistant Examiner — Kevin Quarterman
(74) Attorney, Agent, or Firm — John F. Salazar; Mark L. Beloborodov

(57) ABSTRACT

The invention provides an illumination device (100) comprising a translucent exit window (200), one or more transmissive windows (300), arranged upstream from LED(s) and downstream from the translucent exit window (200), and one or more luminescent material layers (400), which may particularly be coated to the downstream and upstream faces of the transmissive windows (300).

14 Claims, 11 Drawing Sheets

(56) References Cited

U.S. PATENT DOCUMENTS

| | | |
|---|---|---|
| 2007/0145397 A1 | 6/2007 | DenBaars et al. |
| 2007/0210326 A1 | 9/2007 | Kurihara |
| 2007/0215890 A1 | 9/2007 | Harbers et al. |
| 2007/0240346 A1 * | 10/2007 | Li et al. .......................... 40/544 |

* cited by examiner

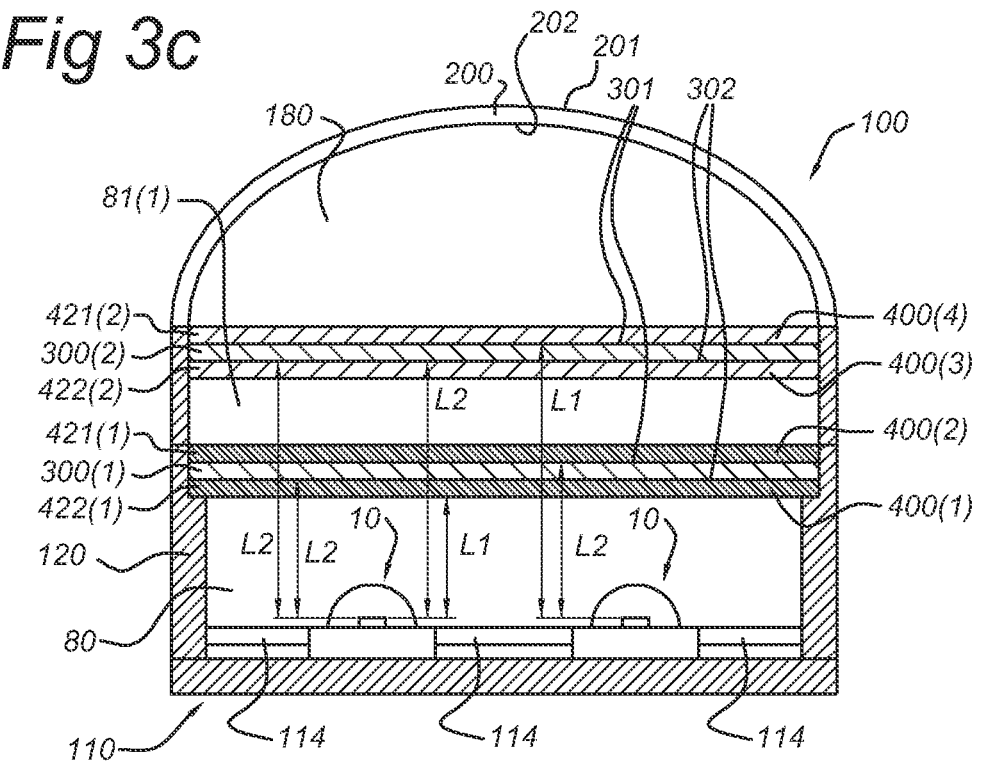
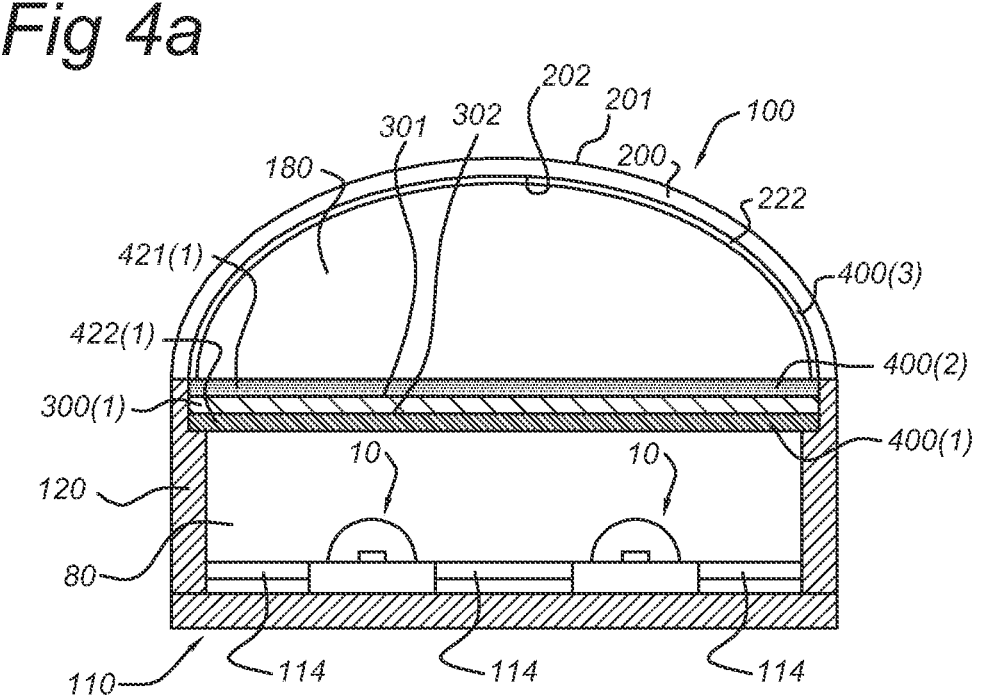

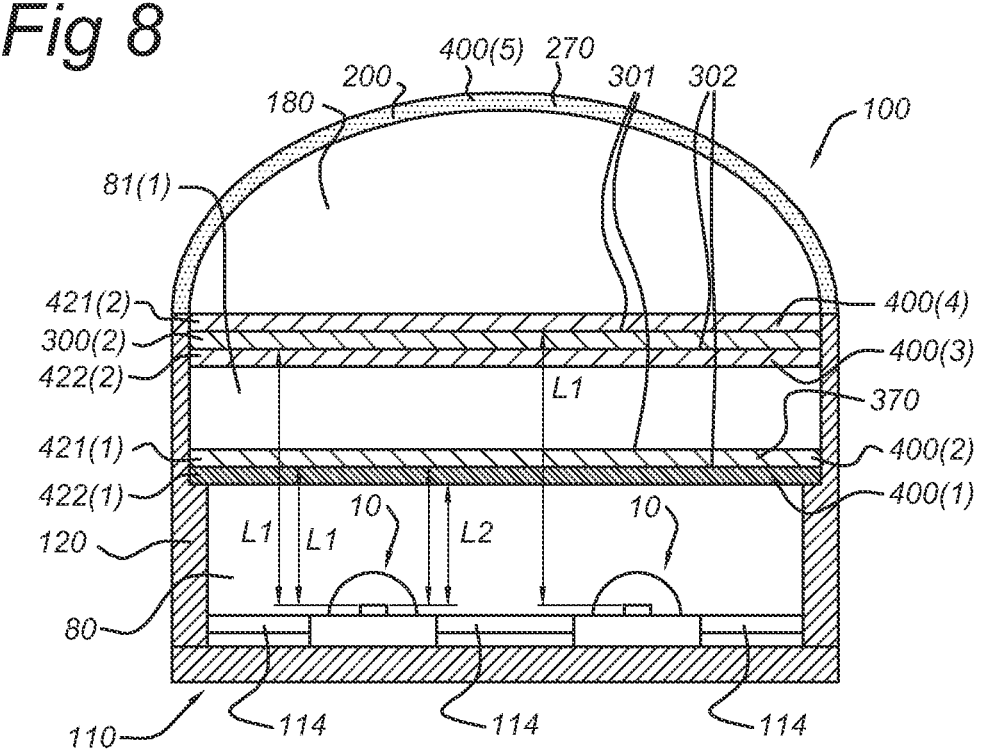

US 8,567,974 B2

ILLUMINATION DEVICE WITH LED AND ONE OR MORE TRANSMISSIVE WINDOWS

FIELD OF THE INVENTION

The invention relates to an illumination device with one or more transmissive windows.

BACKGROUND OF THE INVENTION

Illumination devices comprising a transmissive ceramic layer are known in the art. Transmissive ceramic layers or luminescent ceramics, and their method of preparation, are known in the art. It is for instance referred to US2005/0269582. US2005/0269582 for instance discloses a semiconductor light emitting device combined with a ceramic layer which is disposed in a path of light emitted by the light emitting layer. The ceramic layer is composed of or includes a wavelength converting material such as a luminescent material.

Illumination devices with a transmissive cover and a luminescent material are for instance described in US2007/0114562. This document describes for instance yellow and red illumination systems, including a semiconductor light emitter, and a luminescent material. The systems' emission falls within the respective ITE red and yellow color bins having specified color coordinates on the CIE chromaticity diagram. The luminescent material may include one or more luminescent materials. The illumination systems may be used as the red and yellow lights of a traffic light or an automotive display.

US2007/0114562 further discloses a LED illumination system comprising a support on which the semiconductor light emitter is disposed, a cover disposed on the support and extending over the semiconductor light emitter, the cover and the support cooperatively defining an interior volume containing the semiconductor light emitter; and an encapsulant disposed in the interior volume and encapsulating the semiconductor light emitter. The luminescent material is deposited on an inside surface of the cover.

SUMMARY OF THE INVENTION

A disadvantage of the prior art systems may be that in modules where the light is not recycled multiple times before being emitted from the system (as is the case in e.g. LCD backlighting modules), and in particular for the generation of warm white light, a relatively highly luminescent material load per unit area and, as a result, a very thick luminescent material layer, may be required. The luminescent material dilution in the matrix material should be sufficient to enable good flowing properties, which may result in relatively very thick layers of binder material comprising the luminescent material particles, which may hamper the coating process and may result in stress gradients due to different material properties of the film and the coating. This can easily result in film cracking, curling and even delamination.

Further, characteristics of the luminescent material components may vary in time, e.g. the particle size distribution or the quantum efficiency. This might be compensated for by adaptation of the luminescent material ratio(s) and/or the effective luminescent material load on the film, and preferably the final coated film optical properties are measured and should be within certain limits. This required adaptation of the luminescent material coating suspension may lead to significant waste of material because the pre-mixed material generally cannot be used any more. On-the-fly closed loop control of the film properties in a roll-to-roll process is very difficult with the single mixture.

Another problem in the prior art may be that a mixture of luminescent materials may lead to significant luminescent material interaction for most luminescent materials of interest for illumination. The yellow-green light emitted from one luminescent material (or luminescent material mixture) may often be absorbed partly by the red-orange emitting luminescent material (or luminescent material mixture), resulting in a lower overall system efficacy (because of the additional quantum efficiency losses in the red-orange luminescent material) and a reduced color rendering because of changes in the spectral shape of the yellow-green light. The latter is caused by the spectral absorption of the red-orange luminescent material. Typically this can result in a drop in CRI from e.g. 85 to 77, which makes the light in most applications unsuitable for general illumination tasks. Furthermore, the luminescent material interaction may require more luminescent material, making the system more expensive.

Another disadvantage of the prior art systems may be that applying a luminescent material layer as an exit window or as material visible to a viewer may result in a color of the exit window, particularly a yellow-orange color, when the system is in the off-state. This may be the case when the luminescent material can be viewed directly, e.g. when this window is the light emitting exit window. Such a colored appearance of a lamp (or luminaire) is often unwanted; a neutral appearance is preferred in general.

Hence, it is an aspect of the invention to provide an alternative illumination device, which preferably further obviates one or more of the above-described drawbacks.

In a first aspect, the invention provides an illumination device comprising:

a. a light emitting diode (LED) arranged to emit LED emission;

b. a translucent exit window, having an upstream exit window face and a downstream exit window face;

c. n transmissive windows arranged downstream of the LED and upstream of the translucent exit window, wherein n is equal to or larger than 1, each transmissive window having an upstream transmissive window face and a downstream transmissive window face;

d. k luminescent material layers, wherein k is equal to or larger than 1, particularly equal to or larger than 2, the luminescent material layers are optionally spatially separated, the k luminescent material layers are arranged downstream of the LED and upstream of the translucent exit window, and the k luminescent material layers are spatially separated from the LED;

wherein the LED and the luminescent material are arranged to generate light of a predetermined color, and wherein the translucent exit window is arranged to transmit at least part of the light.

Such a device may advantageously have thinner luminescent material layers, by means of which luminescence interaction may be diminished. Further, the use of thinner layers, preferably with a thickness of less than about 100 μm, may have the above described processing advantages. For instance, layers having a thickness in the range of about 5-100 μm may be applied, the thickness for instance depending upon the number of luminescent material layers and upon the type of luminescent material. Further, the illumination device according to the invention may allow separation of different types of luminescent materials. In this way, the illumination properties of the illumination device in relation to the luminescence properties of the different types of luminescent materials may be optimized. In addition, the illumination device according to the invention may, in particular, look white when it is in the off-state and illuminated (from the outside) with white light. Other advantages, particularly relative to systems where the luminescent material is provided on the LED, may be that an intrinsically efficient system (less back reflection/reabsorption) may be provided and that a warm white option (without substantial thermal quenching and with a relatively "low" irradiation of the luminescent material) may be provided. Further, the illumination device according to the invention is a relatively simple concept (may be based on blue LED(s) only, which has the advantage of a relatively easy assembly and driving) and, furthermore, the option of an adjustable color temperature is feasible.

The phrase "n transmissive windows arranged downstream of the LED and upstream of the translucent exit window" indicates that each of these transmissive windows receives at least part of the (converted) LED light and transmits at least part of this (converted) LED light in the direction of the translucent exit window. One or more such transmissive windows may be comprised by the illumination device.

The phrase "k luminescent material layers", refers to luminescent material layers that receive at least part of the (converted) LED light, but also transmit at least part of this (converted) LED light. Hence, in a number of embodiments, the transmissive window(s) comprise(s) one or more luminescent material layers. The phrase "wherein the luminescent material layers are (optionally) spatially separated" indicates that the respective luminescent material layers are (optionally) spatially separated from each other. The term "luminescent material layers" is herein sometimes also indicated as "coating" or "coating layer", although the invention is not limited to coating layers only.

The k luminescent material layers are (also) spatially separated from the LED (i.e. "remote"). This implies that the luminescent material layers that are indicated here as "k luminescent material layers" are not coated on the LED (or coated on the die). Particularly, the device according to the invention does not comprise a luminescent material coating on the LED and/or preferably also does not comprise a LED dome comprising luminescent material. In another embodiment, one or more of the LEDs emit light other than blue light. Such LEDs may however, in an embodiment, comprise luminescent materials coated on the LED and/or comprised in a LED dome. Such an application may for instance be used to further enlarge the color gamut and/or to improve the CRI of the light from the illumination device. The illumination device according to the invention however at least comprises luminescent layers that are spatially separated from the LED(s). Herein, the term "LED" may refer to one or more LEDs.

The phrase "wherein the luminescent material layers are arranged downstream of the LED and upstream of the translucent exit window" indicates that the luminescent material layers, and thus the luminescent material contained therein, is remote from the LED (see also above), but upstream from the translucent exit window. The phrase "upstream from the translucent exit window" may include a luminescent material layer at the interior of this window (vide infra). The one or more k luminescent material layers are particularly arranged to the upstream transmissive window face(s) and/or the downstream transmissive window face(s) of the n transmissive window(s) or incorporated in the n transmissive windows (or combinations of one or more of such embodiments). Such configurations are herein also indicated by means of the phrase "wherein the transmissive window comprises a luminescent material layer", or "wherein the transmissive window comprises a luminescent material upstream (or downstream) coating layer" and similar phrases.

Remote luminescent material in LED-based light sources seems to be very advantageous with respect to system efficacy, in particular for the generation of light with a low color temperature (warm white). Applying a luminescent material coating on a transmissive support or film may result in high system efficacy, because only a small amount of light is reflected back into the LED where it has a rather high chance of being absorbed. Using the luminescent material remote from the LEDs can result in efficacy gains of up to about 50% compared to systems with luminescent material in the LED package.

As mentioned above, applying a luminescent material layer at the surface, particularly the emitting surface (i.e. downstream surface), of an exit window may result in a rather saturated color point of that surface when the lamp is off and when it is illuminated with white light. The degree of saturation of the appearing color of the exit window can be reduced, according to the invention, by applying the luminescent material coating on a transmissive carrier located in between the LEDs and a diffusive, translucent material exit window of the illumination device. The translucent exit window acts as the virtual emission window (for the further optical system, where the light may be further manipulated for e.g. beam shaping). With increasing distance between the luminescent material layer and the translucent exit window, the saturation of the color of the translucent exit window is further reduced. The measures listed above and hereinafter may amongst others be based on applying additional scattering or reflection in the system. Surprisingly, however, the system efficiency is almost preserved, while in general the addition of more scattering and more (partly) reflective surfaces in a system cause a very significant reduction of the system efficiency.

Illumination Device

The illumination device is herein also indicated as "device". Relative to the LED(s), the one or more transmissive windows are arranged downstream of the LED(s). The transmissive window(s) is (are) preferably arranged in such a way that substantially all emission generated by the LED(s) is directed towards the transmissive window, i.e. the transmissive window(s) is (are) disposed in a path of light emitted by the LED(s). Hence, in a preferred embodiment, the luminescent material and/or the transmissive window(s) receive substantially all LED emission.

The translucent exit window is arranged downstream from the transmissive window(s). Hence, the transmissive window(s) has (have) an upstream exit window face directed towards the LED(s) and a downstream exit window face directed towards the translucent exit window; the translucent exit window has an upstream exit window face directed towards a downstream face of the transmissive window and a downstream exit window face directed towards the exterior of the illumination device.

As mentioned above, this exit window is arranged to allow light to escape from the illumination device. However, further optics are not excluded, such as collimators, reflectors, light guides, optical layers etc., to guide or influence the light from the illumination device, which further optics may be arranged downstream of the exit window.

With the invention, remote luminescent material modules and lamps can be realized that have a very high efficiency and good color rendering, and that can also have a white appearance or are almost color-neutral when in the off-state. The proposed systems with the luminescent material in or on a transmissive window, such as a film, may also enable cheap mass production by roll-to-roll processing, and may combine homogenisation with efficiency optimization.

As mentioned above, the illumination device according to the invention preferably comprises two or more luminescent material layers. Since there may be one or more transmissive windows, one or more, particularly two or more, luminescent material layers, and since the luminescent material layers may comprise different types of luminescent materials, the invention allows a large number of configurations (or embodiments).

In an embodiment, the illumination device comprises a first transmissive window, wherein the upstream transmissive window face of the first transmissive window comprises a first luminescent material upstream coating layer, and the downstream transmissive window face of the first transmissive window comprises a first luminescent material downstream coating layer.

In a further embodiment, the illumination device further comprises a second transmissive window, wherein the upstream transmissive window face of the second transmissive window comprises a second luminescent material upstream coating layer, and the downstream transmissive window face of the second transmissive window comprises a second luminescent material downstream coating layer.

As will be clear to the person skilled in the art, other variants may include embodiments where the illumination device comprises a first transmissive window, wherein the upstream transmissive window face of the first transmissive window comprises a first luminescent material upstream coating layer and/or the downstream transmissive window face of the first transmissive window comprises a first luminescent material downstream coating layer, and/or embodiments where the illumination device further comprises a second transmissive window, wherein the upstream transmissive window face of the second transmissive window comprises a second luminescent material upstream coating layer and/or wherein the downstream transmissive window face of the second transmissive window comprises a second luminescent material downstream coating layer.

In a further embodiment, the upstream exit window face of the translucent exit window comprises a luminescent material upstream exit window coating layer. In a specific embodiment, the luminescent material upstream exit window coating layer comprises a luminescent material arranged to emit red light.

Good results may be obtained with illumination devices wherein k is in the range of 2-5 and n is in the range of 1-2. For instance, a device may comprise, in an embodiment, two transmissive windows, each having a luminescent material upstream coating layer and each having a luminescent material downstream coating layer (n=2; k=4), and optionally also a luminescent material upstream exit window coating layer (making n=2 and k=5).

In an embodiment, at least two luminescent material layers comprise substantially identical luminescent material compositions. In yet another embodiment, at least two luminescent material layers comprise substantially different luminescent material compositions. The term "luminescent material composition" may refer to a composition comprising one or more different luminescent materials. In this context, the terms "different" and "identical" particularly relate to the color of the light generated under equal excitation conditions. An example of two luminescent material layers comprising substantially identical luminescent material coating compositions, may be coatings comprising $Y_3Al_5O_{12}$:Ce (YAG:Ce), wherein in both luminescent materials cerium is substantially present in the same molar amount.

In an embodiment, a first luminescent material layer is arranged to generate light of a first color and a second luminescent material layer is arranged to generate light of a second color, wherein the light of a first color has a dominant emission wavelength larger than the light of a second color, and wherein the first luminescent material layer is arranged upstream of the second luminescent material layer. For instance, a red emitting luminescent material may be comprised in a luminescent material upstream coating layer of a transmissive window and a green or yellow emitting luminescent material may be comprised in a luminescent material downstream coating layer of the same transmissive window. An advantage of such a configuration may be that the green and/or yellow luminescence, respectively, is substantially not absorbed by the red-emitting luminescent material. If the configuration were the other way round, the red luminescent material might absorb part of the green and/or yellow luminescence, respectively. Hence, in an embodiment, the first luminescent material layer comprises a luminescent material arranged to emit red light.

In a specific embodiment, one or more of the luminescent material layers comprise patterned coating layers. Hence, in an embodiment, one or more of the luminescent material layers are substantially continuous layers, more particularly, all luminescent material layers are substantially continuous layers, and in another embodiment, one or more of the luminescent material layers comprise patterned coating layers. An advantage of using one or more patterned layers may be that luminescent material interaction may be diminished, thereby reducing possible (reabsorption) losses.

In a specific embodiment, one or more windows selected from the group consisting of the translucent exit window and one or more of the n transmissive windows comprise independently one or more of the luminescent material layers as translucent luminescent exit window and transmissive luminescent windows, respectively. For instance, part of the luminescent material may be integrated into one or more of the transmissive windows and/or the translucent exit window. In an embodiment, such a window may be a luminescent ceramic. In another embodiment, luminescent material may be dispersed in one or more of such windows.

Hence, in an embodiment, the luminescent material layer may be a coating layer and, in another embodiment, it may be integrated in a window. The latter is indicated as (translucent) luminescent (exit) window, which thus comprises a luminescent material layer, but may also be seen as luminescent material layer, since such a window has window properties (at least partially transmissive to light) but also luminescent properties.

Such luminescent windows may nevertheless also comprise a luminescent material coating (at the upstream face and/or the downstream face).

Further, the illumination device according to embodiments of the invention may also comprise one or more dichroic filters. Such filters are particularly arranged downstream of the LED and upstream of the translucent exit window, and are further arranged to transmit at least part of the light upstream of the one or more dichroic filters, and to reflect at least part of the light downstream of the one or more dichroic filters.

In addition to the k luminescent material layers described herein, which in principle are at least partly transparent, in an embodiment, the illumination device may further comprise a luminescent material layer arranged to generate emission in a reflective mode. Such a luminescent material layer may be indicated as non-transmissive luminescent material layer, and may for instance be arranged at the walls and/or bottom (such as a substrate) of the device. Hence, unless indicated otherwise, the luminescent material layers are, in an embodiment, particularly arranged to allow transmission of at least part of the light in the direction of the translucent exit window or, even more particularly, to the exterior of the illumination device downstream of the translucent exit window. The luminescent material layer arranged to generate emission in a reflective mode, however, is particularly arranged at non-transmissive parts, such as LED chamber walls or LED supports (like an LED board).

The device according to embodiments of the invention may have different types of shapes; or more accurately, the exit window and transmissive window may have different types of shapes. In an embodiment, one or more windows selected from the group consisting of the translucent exit window and one or more of the n transmissive windows have independently a substantially flat shape. In another embodiment, one or more windows selected from the group consisting of the translucent exit window and one or more of the n transmissive windows have independently a substantially convex shape. As will be clear to the person skilled in the art, combinations of flat and convex windows may also be applied.

In a specific embodiment, the device further comprises a sensor, particularly an optical sensor, wherein the sensor is arranged to receive substantially only indirect light. Hence, such a sensor must not be subjected to direct radiation; in this way, thermal loads may be substantially prevented. Further, when applying an optical sensor, an advantage may be that the optical sensor may sense substantially mixed light, whereas a sensor receiving direct light may receive light that is less mixed (for instance due to the fact that the LED light may be only partly lambertian after transmission through one or more luminescent material layers).

The illumination device of the invention is particularly arranged to generate light of a predetermined color, such as white light.

The proposed configurations can be applied in large-area lighting, ambiance lighting (e.g. light tiles), backlighting (e.g. poster boxes), downlighters, diffuse retrofit lamps such as incandescent (GLS) or TL replacement lamps, and wall washers and, depending on volume and beam constraints, in some spot lamps.

Below, some further details are given concerning the LED and luminescent material, the transmissive window and the translucent exit window, respectively.

LED and Luminescent Material

In an embodiment, the LED is arranged to emit blue emission and the luminescent material comprises (a) a green luminescent material, arranged to absorb at least part of the blue LED emission and to emit green emission, and (b) a red luminescent material, arranged to absorb at least part of the blue LED emission, or at least part of the green emission, or at least part of the blue emission and at least part of the green emission and emit red emission. In this way, the light of a predetermined color may be white light. Depending upon, amongst others, LED power, the blue LED emission spectrum, and luminescent material amounts white light of different color temperatures may be composed.

In another embodiment, the LED is arranged to emit blue emission, and the luminescent material comprises (a) a yellow luminescent material, arranged to absorb at least part of the blue emission and emit yellow emission, and optionally (b) one or more other luminescent materials, arranged to absorb at least part of the blue LED emission, or at least part of the yellow emission, or at least part of the blue emission and at least part of the yellow emission and emit emission at an emission wavelength different from the yellow emission wavelength. Also in this way, the light of a predetermined color may be white light. Depending upon, amongst others, the blue LED emission spectrum, LED power and the amounts of luminescent material, white light of different color temperatures may be composed. In a specific embodiment, the luminescent material, in addition to the yellow luminescent material (a), further comprises (b) a red luminescent material, arranged to absorb at least part of the blue LED emission, or at least part of the yellow emission, or at least part of the blue emission and at least part of the yellow emission and emit red emission. This red luminescent material may, amongst others, be applied to further improve the CRI.

In an embodiment, the illumination device comprises a plurality of light emitting diodes (LEDs), such as in the order of 2-100, for example 4-64, which are arranged to emit LED emission.

The term white light used herein is known to the person skilled in the art. It particularly relates to light having a correlated color temperature (CCT) between about 2,000 and 20,000 K, particularly between 2,700-20,000 K. For general lighting, the CCT particularly lies in the range of about 2,700 K to 6,500 K, and for backlighting purposes it lies particularly in the range of about 7,000 K to 20,000 K, and particularly within about 15 SDCM (standard deviation of color matching) from the BBL, more particularly within about 10 SDCM from the BBL, even more particularly within about 5 SDCM from the BBL. The term "predetermined color" may relate to any color within the color triangle, but may particularly refer to white light.

The terms "blue light" or "blue emission" particularly relate to light having a wavelength in the range of about 410-490 nm. The term "green light" particularly relates to light having a wavelength in the range of about 500-570 nm. The term "red light" particularly relates to light having a wavelength in the range of about 590-650 nm. The term "yellow light" particularly relates to light having a wavelength in the range of about 560-590 nm.

These terms do not exclude that particularly the luminescent material may have a broadband emission having emission wavelength(s) outside the range of for instance about 500-570 nm, about 590-650 nm, and about 560-590 nm, respectively. However, the dominant wavelength of emissions of such luminescent materials (or of the LED) will be found within the ranges given herein. Hence, the phrase "with a wavelength in the range of" particularly indicates that the emission may have a dominant emission wavelength within the specified range.

Particularly preferred luminescent materials are selected from garnets and nitrides, particularly doped with trivalent cerium or divalent europium, respectively. Embodiments of garnets particularly include $A_3B_5O_{12}$ garnets, wherein A comprises at least yttrium or lutetium and B comprises at least aluminum. Such garnet may be doped with cerium (Ce), praseodymium (Pr) or a combination of cerium and praseodymium; particularly however with Ce. In particular, B comprises aluminum (Al), however, B may also partly comprise gallium (Ga) and/or scandium (Sc) and/or indium (In), particularly up to about 20% of Al, more particularly up to about 10% of Al (i.e. the B ions essentially consist of 90 or more mole % of Al and 10 or less mole % of one or more of Ga, Sc and In); B may particularly comprise up to about 10% gallium. In another variant, B and O may at least partly be replaced by Si and N. The element A may particularly be selected from the group consisting of yttrium (Y), gadolinium (Gd), terbium (Tb) and lutetium (Lu). Further, Gd and/or Tb are in particular only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1.

The term "Ce" indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for maximally 10%; in general, the Ce concentration will be in the range of 0.1-4%, particularly 0.1-2% (relative to A). Assuming 1% Ce and 10% Y, the full, correct formula could be $(Y_{0.1}Lu_{0.89}Ce_{0.01})_3Al_5O_{12}$. Ce in garnets is substantially or only in the trivalent state, as is known to the person skilled in the art.

The red luminescent material may comprise, in an embodiment, one or more materials selected from the group consisting of (Ba,Sr,Ca)S:Eu, (Ba,Sr,Ca)AlSiN$_3$:Eu and (Ba,Sr,Ca)$_2$Si$_5$N$_8$:Eu. In these compounds, europium (Eu) is substantially or only divalent, and replaces one or more of the indicated divalent cations. In general, Eu will not be present in amounts larger than 10% of the cation, particularly it will range from about 0.5-10%, more particularly from 0.5-5% relative to the cation(s) it replaces. The term ":Eu" indicates that part of the metal ions is replaced by Eu (in these examples by Eu$^2$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, particularly Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); in particular, M comprises in this compound calcium or strontium, or calcium and strontium, more particularly calcium. Here, Eu is introduced and replaces at least part of M (i.e. one or more of Ba, Sr, and Ca).

Further, the material (Ba,Sr,Ca)$_2$Si$_5$N$_8$:Eu can also be indicated as M$_2$Si$_5$N$_8$:Eu, wherein M is one or more elements selected from the group consisting of barium (Ba), strontium (Sr) and calcium (Ca); in particular, M comprises in this compound Sr and/or Ba. In a further specific embodiment, M consists of particularly 50-100% Sr and/or Ba (not taking into account the presence of Eu), particularly 50-90% Ba and 50-0%, particularly 50-10% Sr, such as Ba$_{1.5}$Sr$_{0.5}$Si$_5$N$_8$:Eu (i.e. 75% Ba; 25% Sr). Here, Eu is introduced and replaces at least part of M, i.e. one or more of Ba, Sr, and Ca).

Likewise, the material (Ba,Sr,Ca)AlSiN$_3$:Eu can also be indicated as MAlSiN$_3$:Eu, wherein M is one or more elements selected from the group consisting of barium (Ba), strontium (Sr) and calcium (Ca); in particular, M comprises in this compound calcium or strontium, or calcium and strontium, more particularly calcium. Here, Eu is introduced and replaces at least part of M (i.e. one or more of Ba, Sr, and Ca).

The term luminescent material used herein particularly relates to inorganic luminescent materials, which are also sometimes indicated as luminescent materials. These terms are known to the person skilled in the art.

Transmissive Window

Particularly at a non-zero distance from the LED(s) (i.e. particularly from the light emitting surface (or dies) of the LED(s)), a transmissive window is arranged.

The term "transmissive" used herein may in one embodiment refer to transparent and in another embodiment to translucent. These terms are known to the person skilled in the art. Transmissive may particularly indicate that transmission of light by the transmissive window, particularly at least in the blue range, more generally in the whole visible range (i.e. about 380-680 nm), is at least about 20%, more particularly at least about 50%, even more particularly at least about 80% (under perpendicular irradiation of the transmissive window with the light).

The transmissive window may be self-supporting, but in an alternative embodiment it may also be a flexible film, which is for instance stretched (e.g. between LED chamber walls or diffuser cavity walls (see below) of the device). The transmissive window may have a substantially flat shape, like a plate, but in another embodiment it may have a substantially convex shape, like for instance a dome.

The transmissive window may, in an embodiment, comprise an organic material. Preferred organic materials are selected from the group consisting of PET (polyethylene terephthalate), PE (polyethylene), PP (polypropylene), PC (polycarbonate), P(M)MA (poly(methyl)metacrylate), PEN (polyethylene napthalate), PDMS (polydimethylsiloxane), and COC (cyclo olefin copolymer). Polycarbonate for instance gave good results. However, in another embodiment the transmissive window comprises an inorganic material. Preferred inorganic materials are selected from the group consisting of glasses, (fused) quartz, ceramics, and silicones.

The transmissive window may be coated on one or both sides with one or two of the luminescent material layers. Hence, in this case the transmissive window may also be indicated as transmissive support. As mentioned above, in a further embodiment, the transmissive window comprises at least part of the luminescent material. In another embodiment, the transmissive window comprising a luminescent material (layer) is further provided with a coating on one or both sides that comprises also part of the luminescent material (which may have a substantially different emission color or a substantially similar emission color).

Translucent Exit Window

Particularly at a non-zero distance from the downstream surface of the transmissive window, downstream of the transmissive window, a translucent exit window is arranged. This exit window is arranged to allow light from the illumination device to escape from the illumination device.

The translucent exit window may, in an embodiment, comprise an organic material. Preferred organic materials are selected from the group consisting of PET (polyethylene terephthalate), PE (polyethylene), PP (polypropylene), PC (polycarbonate), P(M)MA (poly(methyl)metacrylate), PEN (polyethylene napthalate), COC (cyclo olefin copolymer) and PDMS (polydimethylsiloxane). However, in another embodiment the translucent exit window comprises an inorganic material. Preferred inorganic materials are selected from the group consisting of glasses, (fused) quartz, ceramics, and silicones.

In an embodiment, however, the exit window is translucent. For instance, the above mentioned materials may have intrinsic translucent properties or may be made translucent (for instance by frosting (e.g. by sand blasting or acid etching) the material). Such methods are known in the art. The translucent exit window may allow some light to pass through, but the interior (i.e. objects of the illumination device situated upstream from the exit window) seen through translucent material is substantially diffuse or indistinct.

As mentioned above, in a further embodiment, the exit window comprises at least part of the luminescent material. In another embodiment, the exit window comprising a luminescent material (layer) is further provided with a coating on the upstream side that comprises also part of the luminescent material (which may have a substantially different emission color or a substantially similar emission color).

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 3a-3c schematically depict three embodiments according to the invention, wherein the illumination devices comprise two transmissive windows;

FIGS. 4a-4c schematically depict three embodiments, wherein the illumination device has color separation of the luminescent materials and the illumination device has an exit window coating layer;

FIG. 8 schematically depicts an embodiment, wherein one or more of the transmissive windows and the exit window comprise a luminescent material layer.

Only the essential elements are depicted. Other elements, like drivers, further optics, like optical filters, collimators, fittings, etc., known to the person skilled in the art, are not depicted in the schematic drawings.

DESCRIPTION OF PREFERRED EMBODIMENTS

Figure 1A:
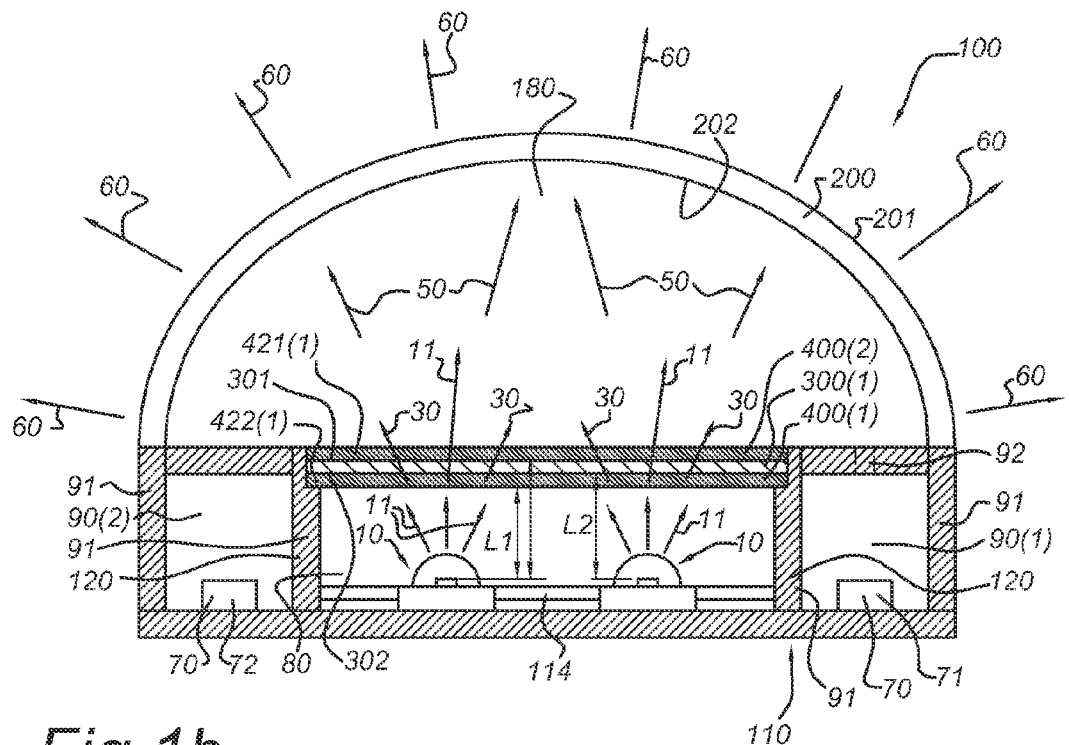
FIGS. 1a-1b schematically depict two embodiments according to the invention.

FIG. 1a schematically depicts an embodiment of the illumination device according to the invention. The illumination device is indicated with reference 100. The illumination device 100 comprises a light emitting diode 10 arranged to emit LED emission 11, which may for instance be blue light.

The illumination device 100 further comprises a translucent exit window 200, having an upstream exit window face 202 and a downstream exit window face 201. The latter is directed to the exterior and the former is substantially directed to the interior of the device 100, more particularly to the LED(s) 10. The translucent exit window 200 may for instance be frosted PC or glass.

Figure 1B:
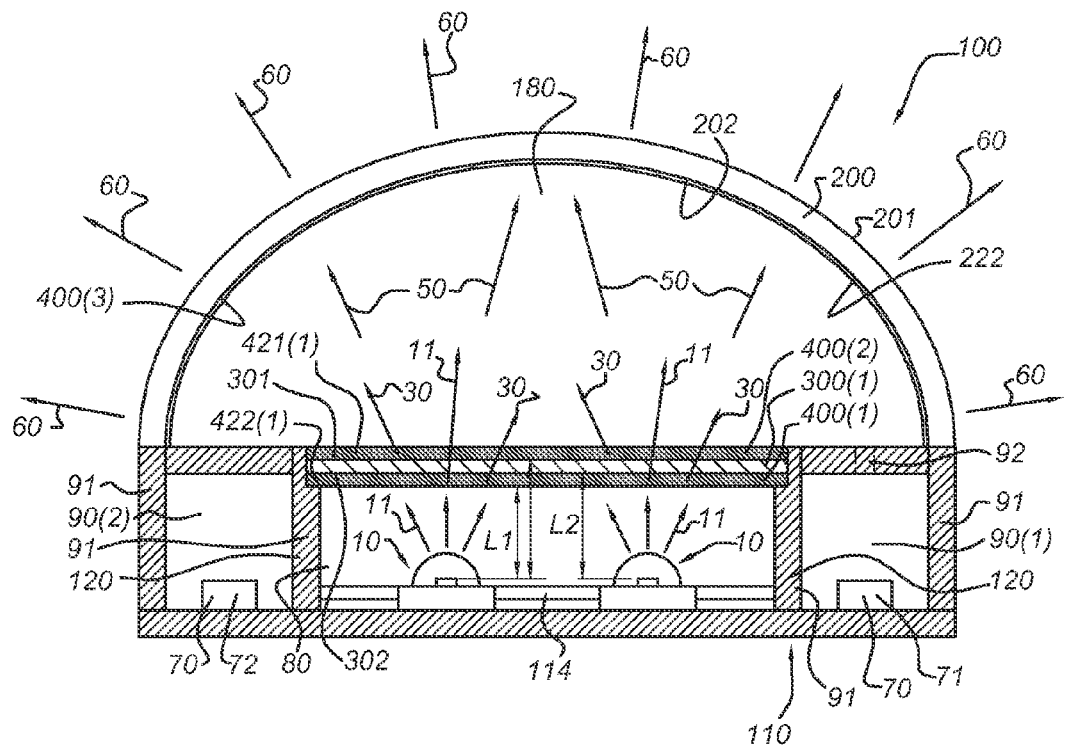

In the schematically depicted embodiment of FIGS. 1a-1b, the translucent exit window 200 has a substantially convex shape.

Downstream of the LED(s) 10 and upstream of the translucent exit window 200, n transmissive windows 300(1), 300(2), ... 300(n) are arranged, wherein n is equal to or larger than 1. The term "n transmissive windows 300(1), 300(2), ... 300(n)" indicates that the illumination device 100 comprises a number of n transmissive windows 300, wherein the windows are indicated with reference 300(1 n), respectively, and wherein transmissive window 300(1) is a first transmissive window 300, transmissive window 300(2) is a second transmissive window 300, etc. Each transmissive window 300 has an upstream transmissive window face 302 and a downstream transmissive window face 301. The former is substantially directed to the LED(s) 10, the latter is substantially directed to the translucent exit window 200. In this way, light 11 from the LED(s) 10 flows in a "downstream" direction to the transmissive window(s) 300, may be at least partially transmitted by the transmissive window(s) 300, and subsequently continues in a downstream direction to the translucent exit window 200, and may at least partially be transmitted by the translucent exit window 200, thereby providing light 60 as light from the illumination device. Such light from the illumination device 60 may for instance be white light.

In the schematic drawings 1a-1b, n is 1, i.e. these illumination devices 100 comprise one transmissive window 300, also indicated as first transmissive window 300(1).

The shortest distance from the LED(s) 10 to the transmissive window 300(n) is indicated with L2. The distance L2 between LED(s) 10 and a first downstream transmissive window 300 will in general be in the range of about 1-50 mm, particularly in the range of about 1-20 mm.

In the schematically depicted embodiments of FIGS. 1a-1b, the transmissive windows 300(1) have a substantially flat shape.

The LED(s) 10 are, as schematically depicted, mounted on a support 110, which may for instance be a board with contacts. The support 110 may further comprise a (plurality of) reflector(s) 114. Light that impinges on the support 110, may in this way be reflected back into the device 100. Reflectors are known in the art, and may for instance comprise substantially diffuse reflectors like Teflon, or may comprise partially diffuse and partially specular reflectors, as known to the person skilled in the art.

The LED(s) 10 are comprised in a LED chamber 80. Here, the support 110, transmissive window 300(1) and LED chamber walls 120 constitute the LED chamber 80. LED chamber 80 may be arranged to serve as a light mixing chamber. Also LED chamber walls 120 (at least the LED chamber wall side directed to the LED(s) 10) may be provided with a reflector (not indicated in the schematic drawing), or preferably may themselves have diffuse, or specular, or a combination of diffuse and specular, reflective properties.

Transmissive window 300(1) is, in this embodiment, the only transmissive window 300, and thus also the transmissive window 300 that is the first transmissive window 300 arranged upstream from the translucent exit window 200, and also the "last" transmissive window 300 arranged downstream from the LED(s). Hence, downstream from the first transmissive window 300(1) and upstream from the translucent exit window 200, a final cavity 180 is formed, enclosed by the first transmissive window 300(1) and the translucent exit window 200, and optionally other illumination device features (see below). The final cavity 180 may be arranged to mix the LED light 11 and the luminescent material light or luminescence 30.

The illumination device 100 further comprises k luminescent material layers (400(1), 400(2), ... 400(k)), wherein k is equal to or larger than 2. The term "k luminescent material layers 400(1), 400(2), ... 400(k)" indicates that the illumination device 100 comprises a number of k luminescent material layers 400, wherein the luminescent material layers are indicated with reference 400(1 k), respectively, and wherein luminescent material layer 400(1) is a first luminescent material layer 400, luminescent material layer 400(2) is a second luminescent material layer 400, etc.

In an embodiment, the luminescent material layer(s) 400 may comprise a plurality of luminescent material layers. However, the term "k luminescent material layers" used herein refers to separate luminescent material layers, which individually may independently comprise a plurality of luminescent material layers. Further, in an embodiment, these luminescent material layers 400(1), 400(2), ... 400(k) may be spatially separated.

The k luminescent material layers 400(1), 400(2), ... 400(k) are arranged downstream of the LED 10 and upstream of the translucent exit window 200. Further, the k luminescent material layers 400(1), 400(2), ... 400(k) are spatially separated from the LED (10). The shortest distance from the LED(s) 10 to the luminescent material layers 400, (here 400(1) and 400(2)) is indicated with L1. The distance L1 between LED(s) 10 and the luminescent material layers 400(1) will be in the range of about 1-50 mm, particularly in the range of about 1-20 mm.

Referring to FIG. 1a, the illumination device 100 comprises two luminescent material layers 400, i.e. k is 2. These luminescent material layers 400 are indicated with references 400(1) and 400(2), respectively. In this embodiment, the former is arranged as upstream coating to the first transmissive window 300(1) and the latter is arranged as downstream coating to the first transmissive window 300(1). Hence, more particularly, this illumination device 100 comprises the first transmissive window 300(1), wherein the upstream transmissive window face 302 comprises a first luminescent material upstream coating layer 422(1), and the downstream transmissive window face 301 comprises a first luminescent material downstream coating layer 421(1).

The two luminescent material layers 400(1), 400(2), . . . 400(k), here the first luminescent material layer 400(1) and the second luminescent material layer 400(2) may, in an embodiment, comprise substantially identical luminescent material compositions (as depicted in FIGS. 1a and 1b). However, in another embodiment, the first luminescent material layer 400(1) and the second luminescent material layer 400(2) may comprise substantially different luminescent material compositions.

The LED(s) are arranged to generate light of a predetermined color, herein also indicated as LED emission 11. Part of this LED emission 11 may be absorbed by the luminescent material in the luminescent material layers 400, thereby converting part of the absorbed light into luminescent material luminescence 30. The combination of LED emission 11 and luminescent material luminescence 30 provides light 50, of the predetermined color, such as white light. Hence, the LED(s) 10 and the luminescent material layers 400(1), 400(2), . . . 400(k) are arranged to generate light (50) of a predetermined color. The translucent exit window 200 is arranged to transmit at least part of the light 50. In this way, light from the illumination device 60 is generated during operation of the illumination device 100. The color of the light from the illumination device 60 may be substantially the same as the color of the mixed light 50. However, particularly when embodiments are applied wherein the translucent exit window 200 comprises a luminescent material upstream exit window coating layer (see below), the colors may differ.

In the specific embodiment of FIG. 1a, directly adjacent to the LED chamber 80, one or more other chambers or cavities may be arranged. These chambers are indicated with reference 90. The LED chamber 80 and the one or more other chambers may all be covered by translucent exit window 200. Further, they may comprise chamber walls 91. In an embodiment, a first adjacent chamber 90(1) is comprised in the illumination device 100, here directly adjacent to the LED chamber 80, which first adjacent chamber may, in an embodiment, comprise a sensor 70. In an embodiment, also a second adjacent chamber 90(2) is comprised in the illumination device 100, here directly adjacent to the LED chamber 80, which second adjacent chamber may, in an embodiment, comprise also a sensor 70. In the schematically depicted embodiment, part of the chamber walls 91 coincide with the LED chamber walls 120. As shown in the Figure, the adjacent chambers 90 are, in an embodiment, volumes enclosed by the support 110 and chamber walls 91.

In an embodiment, as schematically depicted in FIG. 1a, both the first and the second adjacent chamber 90(1), 90(2) are comprised by the illumination device 100, the former adjacent chamber for instance comprising an optical sensor 71 and the latter adjacent chamber for instance comprising a thermal sensor 72. The cavities may substantially be closed and/or may for instance have an opening 92 to final cavity 180. In the schematic embodiment of FIG. 1a, the first adjacent chamber 90(1) comprising the optical sensor 71 comprises an opening 92. In the depicted embodiment, the sensor 71 is arranged to receive substantially only indirect light. Hence, such a sensor 71 may not be subjected to direct radiation; in this way thermal loads may substantially be prevented. Hence, the optical sensor 71 may sense substantially mixed light. Alternatively, at least part of the wall between cavity 90(1) and 180 may comprise a translucent material that enables part of the light 50 to reach the optical sensor 71.

Referring to FIG. 1b, substantially the same embodiment as described above is schematically depicted. However, in this embodiment, the downstream exit window face 202 comprises a luminescent material upstream exit window coating layer 222, which may for instance comprise a luminescent material arranged to emit red light. Such a coating layer may also belong to the group of k luminescent material layers 400. Hence, this luminescent material layer is here also indicated with reference 400(3), since it is assumed to be a third luminescent material layer (i.e. k is 3 in FIG. 1b).

FIGS. 2a, 2b, 2c and 2d schematically depict embodiments that are similar to those described in more detail hereinabove in relation to the schematic drawings 1a and 1b. Adjacent chambers 90(1) and 90(2) are not included in these and further schematic drawings, but may of course be part of the embodiments schematically depicted in the other drawings and described below.

Here, also the illumination device 100 comprises light emitting diode(s) 10 arranged to emit LED emission 11, which may for instance be blue light. The illumination device 100 further comprises translucent exit window 200 having upstream exit window face 202 and downstream exit window face 201. The latter is directed to the exterior and the former is substantially directed to the LED(s) 10. In the schematically depicted embodiment of FIGS. 2a, 2b, and 2d, the translucent exit window 200 has a substantially convex shape; in the schematically depicted embodiment of FIG. 2c, the translucent exit window 200 has a substantially flat shape.

Downstream of the LED 10 and upstream of the translucent exit window 200, n transmissive windows 300(1), 300(2), . . . 300(n) are arranged, wherein n is equal to or larger than 1. In the schematic drawings 2a, 2b, 2c and 2d, n is 1, i.e. these illumination devices 100 comprise one transmissive window 300, also indicated as first transmissive window 300(1). In all embodiments schematically depicted in FIGS. 2a, 2b and 2c, the transmissive windows 300(1) have a substantially flat shape. In FIG. 2d, the transmissive window 300(1) has a substantially convex shape.

The illumination device 100 in these embodiments further comprises k luminescent material layers (400(1), 400(2), . . . 400(k)), wherein k is equal to or larger than 2. Referring to FIGS. 2a, 2b, 2c and 2d, the schematically depicted illumination device(s) 100 comprise(s) two luminescent material layers 400, i.e. k is 2. These luminescent material layers are indicated with references 400(1) and 400(2). In this embodiment, the former is arranged as upstream coating to the first transmissive window 300(1) and the latter is arranged as downstream coating to the first transmissive window 300(1). Hence, more particularly, this illumination device 100 comprises the first transmissive window 300(1), wherein the upstream transmissive window face 302 comprises a first luminescent material upstream coating layer 422(1), and the downstream transmissive window face 301 comprises a first luminescent material downstream coating layer 421(1).

Figure 2A:
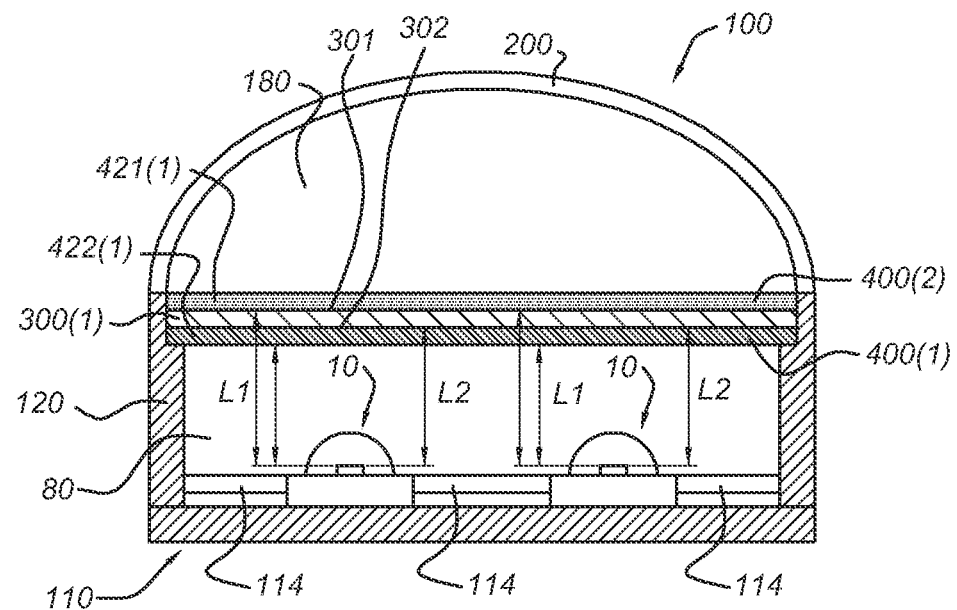
FIGS. 2a-2d schematically depict four embodiments according to the invention, wherein some of the illumination devices have color separation of the luminescent materials.

In FIG. 2a, an embodiment of the illumination device 100 is shown comprising blue LED(s) 10 with a film as transmissive window 300 mounted above the LED(s) 10, which film is coated on both sides with the same luminescent material mixture. These coatings, i.e. the (first) upstream coating layer 422(1) and the (first) downstream coating layer 421(1) are indicated with references 422(1) and 421(1), respectively.

Preferably, both coatings 422(1) and 421(1) have the same thickness; more preferably, both coatings have the same luminescent material load. This may lead to acceptable luminescent material layer thickness and rheology of the suspensions for the coating process, and to excellent thermo-mechanical stress resistance.

Hence, at least two luminescent material layers, here the first luminescent material layer 400(1) and the second luminescent material layer 400(2), may comprise substantially identical luminescent material compositions.

Figure 2B:
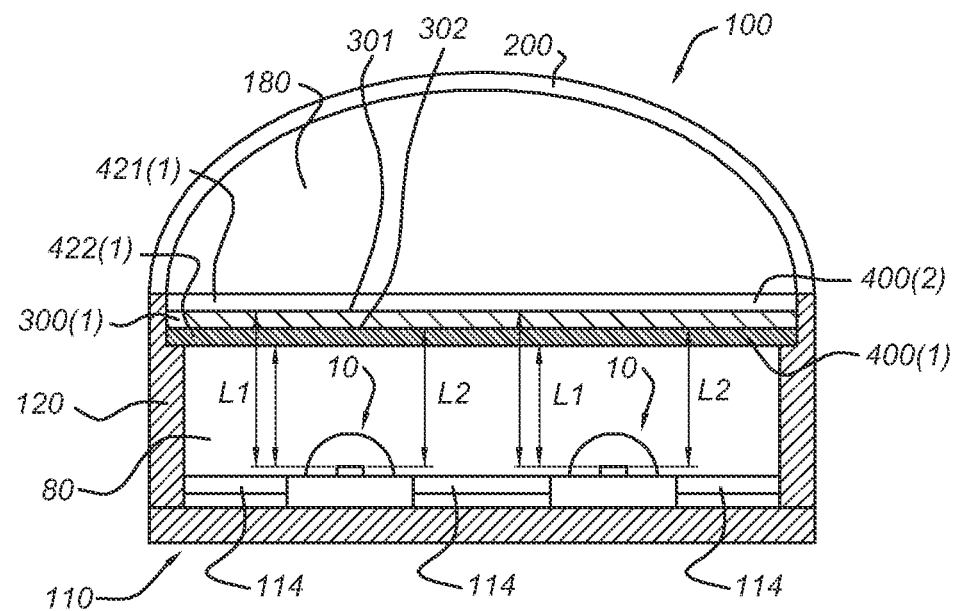

In FIG. 2b, an embodiment of the illumination device 100 is shown comprising blue LED(s) 10 with a film as transmissive window 300 mounted above the LED(s) 10, which film is coated with a red-emitting luminescent material containing luminescent material layer 400(1) on the transmissive window face 302 facing the blue emitting LED(s) 10 and with a yellow-emitting luminescent material containing luminescent material layer 400(2) on the other side of the transmissive window 300. These coatings are indicated with references 422(1) and 421(1), respectively.

For instance, on the upstream face 302 a red-orange-emitting luminescent material, e.g. $Sr_2Si_5N_8$:Eu, $(Ca,Sr)_2Si_5N_8$:Eu, $(Ba,Sr)_2Si_5N_8$:Eu, or $CaAlSiN_3$:Eu, or $(Ca,Sr)AlSiN_3$, may be applied, and on the downstream face 301a yellow-green-emitting luminescent material, e.g. $(Y,Lu,Gd)_3Al_5O_{12}$:Ce, $(Ba,Sr)_2SiO_4$:Eu, or $SrSi_2O_2N_2$:Eu may be applied. This may lead to independent application of the two luminescent material suspensions, enabling simple in-line closed loop process control and reduced material waist, and to higher system efficacy as well as higher color rendering properties of the illumination system by mounting the coated film with the red-orange luminescent material so as to face the pump LED(s) 10 (as the red-orange light is not substantially absorbed by the yellow-green emitting luminescent material).

Note that also another separation of luminescent materials may be applied, which may not primarily be related to the color of the luminescent material, but for instance rather to the thermal stability. For instance, one may apply a luminescent material of a color on a transparent or translucent window (i.e. transmissive window 300) facing the (blue) LED(s) 10, i.e. the above described upstream coating layer 422(1), for instance with a luminescent material load such that at least about 60% of the (blue) light 11 is converted by this luminescent material, and a second luminescent material of a color may be applied on the other side of the substrate facing away from the LED(s) 10, i.e. the above described downstream coating layer 421(1). One may apply the luminescent material that is most sensitive to thermally or photo-thermally induced degradation or quenching (further denoted as "stress-sensitive luminescent material") on the transmissive window 300 that is mounted over the (blue) LED(s) 10, the stress-sensitive luminescent material coating facing away from the LED(s) 10, the other luminescent material(s) (which may be indicated as "non-stress-sensitive luminescent material") being applied on the side of the substrate facing the LED(s) 10. This luminescent material may absorb most of the (blue) light 11. The transmissive window 300 may be a poor heat conductor (heat conduction for instance about <0.1 W/mK; thickness for instance about >2 mm). In this way, the stress-sensitive luminescent material is thermally substantially decoupled from the other luminescent materials, and is subjected to a much lower (blue) irradiance, resulting in relaxed stress conditions and long life time.

In both cases, at least two luminescent material layers 400(1), 400(2) are provided comprising substantially different luminescent material compositions. Hence, the at least two luminescent material layers, here the first luminescent material layer 400(1) and the second luminescent material layer 400(2), may comprise substantially different luminescent material compositions.

The embodiment schematically depicted in FIG. 2c may be substantially identical to the embodiments schematically depicted in FIGS. 2a and 2b as described in more detail hereinabove. However, the translucent exit window 200 in this embodiment is substantially flat.

Figure 2C:
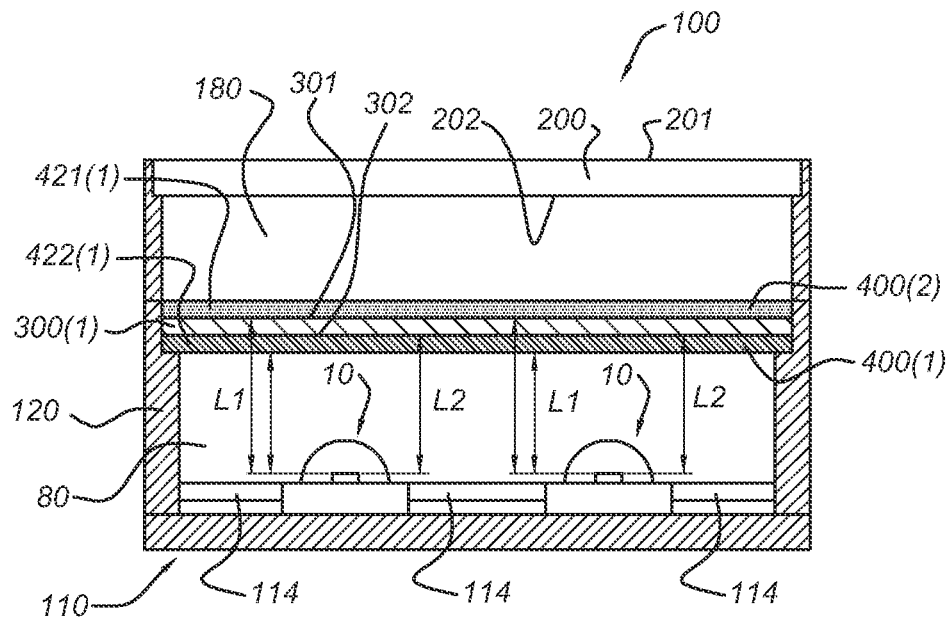
Figure 2D:
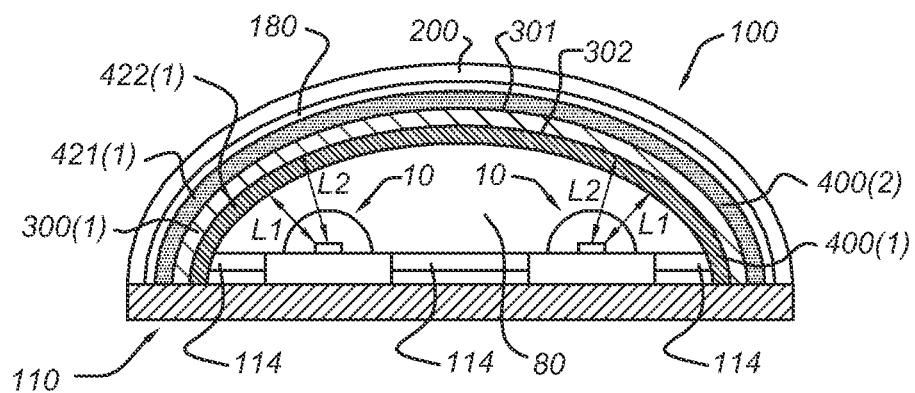

The embodiment schematically depicted in FIG. 2d may be substantially identical to the embodiments schematically depicted in FIGS. 2a, 2b and 2c as described in more detail above. However, the translucent exit window 200 in this embodiment is substantially convex and the transmissive window 300 is substantially convex.

Figure 3A:
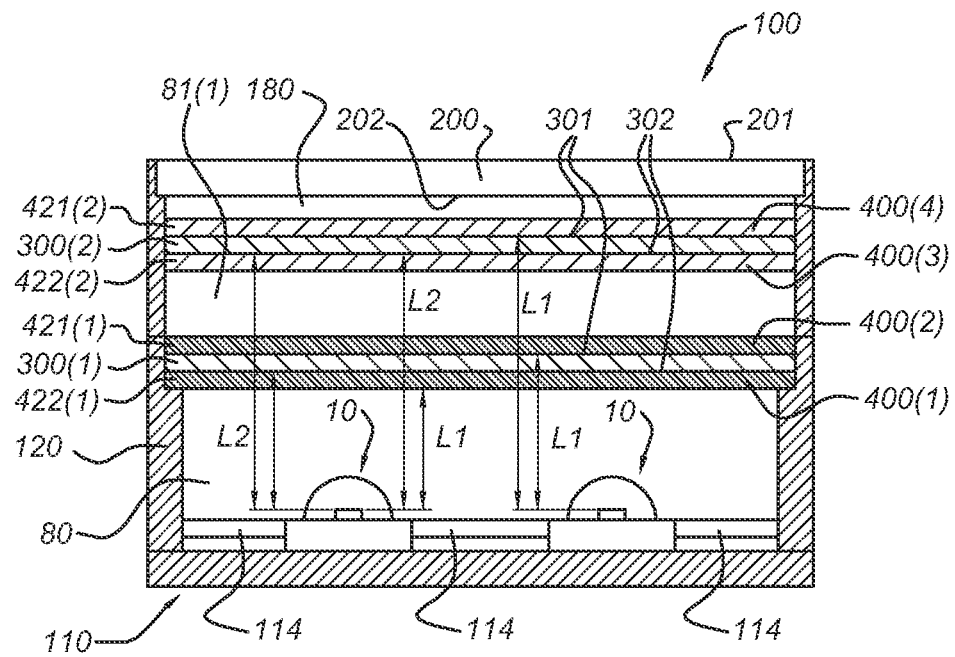
Figure 3B:
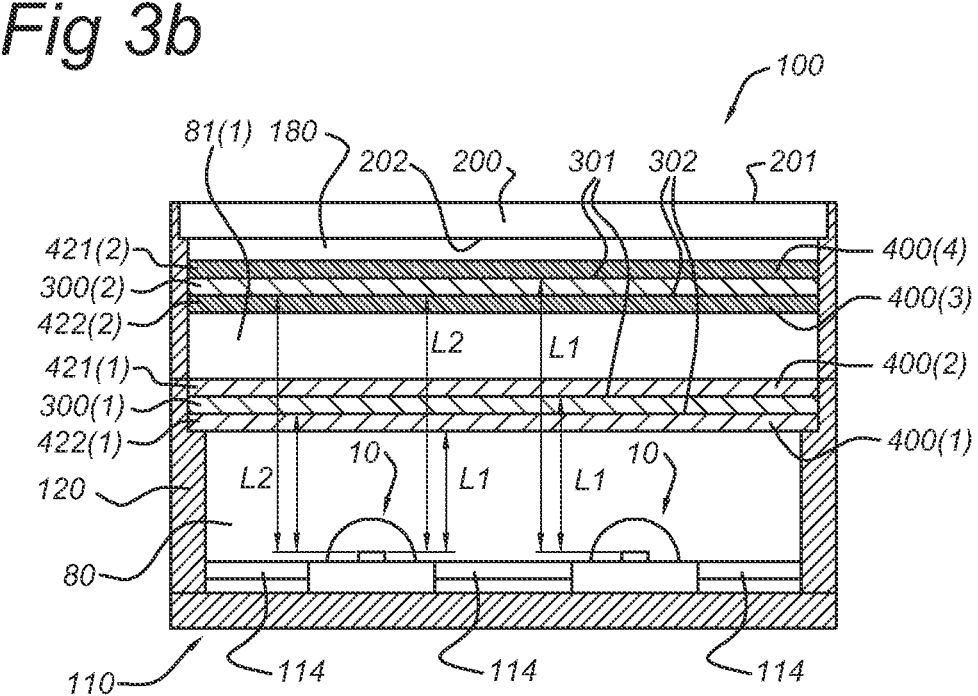

FIGS. 3a, 3b, and 3c schematically depict similar embodiments as described in more detail hereinabove in relation to the schematic drawings. Adjacent chambers 90(1) and 90(2) are not included in the schematic drawings, but may in variants of course be part of the schematically depicted embodiments.

The illumination device is indicated with reference 100. The illumination device 100 comprises light emitting diode(s) 10 arranged to emit LED emission 11, which may for instance be blue light. The illumination device 100 further comprises translucent exit window 200 having upstream exit window face 202 and downstream exit window face 201. The latter is directed to the exterior and the former is substantially directed to the LED(s) 10. In the schematically depicted embodiment of FIGS. 3a and 3b, the translucent exit window 200 has a substantially flat shape; in the schematically depicted embodiment of FIG. 3c, the translucent exit window 200 has a substantially convex shape.

Downstream of the LED 10 and upstream of the translucent exit window 200, n transmissive windows 300(1), 300(2), . . . 300(n) are arranged, wherein n is equal to or larger than 1. In the schematic drawings 3a, 3b and 3c, n is 2, i.e. these illumination devices 100 comprise two transmissive windows 300, also indicated as first transmissive window 300(1) and second transmissive window 300(2). In all embodiments schematically depicted in FIGS. 3a, 3b and 3c, the transmissive windows 300(1) and 300(2) have a substantially flat shape. However, other variants are possible, see also above. The transmissive windows 300(1) and 300(2) may for instance be films, which may for instance support one or more of the k luminescent material layers 400.

The LED(s) 10 are mounted on support 110, which may for instance be a board with contacts. The support 110 may further comprise reflector 114. The LED(s) 10 are comprised in LED chamber 80. Here, the support 110, transmissive window 300(1) and LED chamber walls 120 constitute the LED chamber 80. Also LED chamber walls 120 (at least the LED chamber wall side directed to the LED(s) 10) may be provided with a reflector (not indicated in the schematic drawing).

In this embodiment, transmissive window 300(1) is the first transmissive window 300 and transmissive window 300(2) is the second (and "last") transmissive window 300. The latter is arranged downstream from the former, and is thus the first transmissive window 300 arranged upstream from the translucent exit window 200. Hence, downstream from the second transmissive window 300(2) (the "last" transmissive window) and upstream from the translucent exit window 200, final cavity 180 is formed, enclosed by the second transmissive window 300(2) and the translucent exit window 200, and optionally other illumination device features (see below). The final cavity 180 may be arranged to mix the light from the illumination device. In between the first transmissive window 300(1) and the second transmissive window 300(2) an intermediate transmissive window cavity 81(1) is found. If three or more transmissive windows 300(n) were applied, further intermediate cavities 81(n−1) would be found. Such embodiments, however, are not depicted. The LED to transmissive window distance is indicated as L2, and is here the distance from the LED(s) 10 to transmissive window 300(1) and 300 (2), respectively.

As will be clear to the person skilled in the art, the distances L1 and L2 may vary dependent upon the number n of transmissive windows 300 and the number k of luminescent material layers 400, respectively.

The illumination device 100 in these embodiments further comprises k luminescent material layers (400(1), 400(2), . . . 400(k)), wherein k is equal to or larger than 2. Referring to FIGS. 3a, 3b, and 3c, the schematically depicted illumination device(s) 100 comprise four luminescent material layers 400, i.e. k is 4. These luminescent material layers are indicated with references 400(1), 400(2), 400(3) and 400(4), respectively, in order from upstream to downstream.

In this embodiment, the first two luminescent material layers 400(1) and 400(2) are arranged as upstream coating to the first transmissive window 300(1) and as downstream coating to the first transmissive window 300(1), respectively. Hence, more particularly, this illumination device 100 comprises first transmissive window 300(1), wherein the upstream transmissive window face 302 comprises the first luminescent material upstream coating layer 422(1) and the downstream transmissive window face 301 comprises the first luminescent material downstream coating layer 421(1).

In this embodiment, the other two luminescent material layers 400(3) and 400(4) are arranged as upstream coating to the second transmissive window 300(2) and as downstream coating to the second transmissive window 300(2), respectively. Hence, more particularly, this illumination device 100 comprises the second transmissive window 300(2), wherein the upstream transmissive window face 302 comprises second luminescent material upstream coating layer 422(2) and the downstream transmissive window face 301 comprises second luminescent material downstream coating layer 421 (2).

These embodiments may for instance be used for applying the remote luminescent materials on at least two transmissive windows 300 (such as films) mounted between the LED(s) 10 and the translucent exit window 200, i.e., to apply at least two transmissive windows 300 (such as films) coated with luminescent material above an LED array to enable thinner luminescent material layers 400, and thereby reducing the heat dissipation in the luminescent material transmissive windows 300; preferably, the stress-sensitive luminescent material is applied as a relatively thin layer on a different transmissive window 300 than the other luminescent material(s); this may lead to acceptable luminescent material layer thickness, e.g. <50 μm, with limited heat dissipation, e.g. <0.04 W/cm², in the layer and sufficiently good heat conduction to the surface of the coating and subsequent heat transfer to ambient.

Hence, these embodiments may for instance be used for decoupling the stress-sensitive luminescent material and the thermally stable luminescent material, and for increasing the luminescent material surface area, by applying two transmissive windows 300 (such as films). Typically, luminescent materials like YAG:Ce, LuAG:Ce, $SrSi_2O_2N_2$:Eu, and $CaAlSiN_3$:Eu are very stable luminescent materials, while (Y,Gd)AG:Ce, (Ca,Sr)S:Eu, and $CaSrSi_5N_8$:Eu may show significant stress sensitivity. Preferably, the stress-sensitive luminescent material is applied on both sides of one transmissive window 300, and the thermally stable luminescent material on both sides of the other transmissive window 300. Preferably, the transmissive window 300 with e.g. the stable yellow/green luminescent material is mounted between the LED(s) 10 and the transmissive window with the stress-sensitive luminescent material (in particular a number of red luminescent materials, as well as some yellow/green luminescent materials, are known to be stress-sensitive). In this way the thermal load of the stress-sensitive luminescent material may be reduced by more than a factor of 4 compared to devices wherein only one luminescent material coating 400 (including, in an embodiment, the luminescent material mixture for obtaining white light in combination with the blue LED(s) 10) is applied to only one transmissive window 300.

Two embodiments according to the invention based on separation of the luminescent materials on different films are schematically depicted in FIGS. 3a and 3b. In FIG. 3a, the stress-sensitive luminescent material coating containing first window 300(1) is mounted between the LED(s) 10 and the other luminescent material coating containing second window 300(2). For instance, when both the first luminescent material upstream coating layer 422(1) and the first luminescent material downstream coating layer 421(1), coated onto the upstream face 301 and the downstream face 302, respectively, of first transmissive window 300(1) comprise a red luminescent material, and both the second luminescent material upstream coating layer 422(2) and the second luminescent material downstream coating layer 421(2), coated onto the upstream face 301 and the downstream face 302, respectively, of second transmissive window 300(2) comprise a yellow and/or green-emitting luminescent material, this may result in a high CRI.

In FIG. 3b, the opposite configuration is depicted, wherein the substantially stress-insensitive luminescent material coating comprising first window 300(1) is mounted between the LED(s) 10 and the other luminescent material coating containing second window 300(2), and the second window 300 (2) is the stress-sensitive luminescent material coating comprising transmissive window. For instance, when both the first luminescent material upstream coating layer 422(1) and the first luminescent material downstream coating layer 421(1), coated onto the upstream face 301 and the downstream face 302, respectively, of first transmissive window 300(1) comprise a yellow and/or green luminescent material, and both the second luminescent material upstream coating layer 422 (2) and the second luminescent material downstream coating layer 421(2), coated onto the upstream face 301 and the downstream face 302, respectively, of second transmissive window 300(2), comprise a red-emitting luminescent material, this may result in the lowest temperature for the red luminescent material, but may also result in a somewhat reduced CRI with respect to the former embodiment (as schematically depicted in FIG. 3a). Hence, in FIG. 3a the stress-sensitive red luminescent material comprising transmissive window is mounted between the LED(s) 10 and the yellow (and/or green) luminescent material comprising transmissive window, which may result in a high CRI. In FIG. 3b, the red luminescent material comprising transmissive window is mounted between the yellow (and/or green) luminescent material comprising transmissive window and the translucent exit window, which may result in the lowest temperature for the red luminescent material (but which in some cases also may result in a somewhat reduced CRI).

FIG. 3c schematically depicts an embodiment that may substantially be the same as the embodiments schematically depicted in FIG. 3a or 3c. However, the translucent exit window 200 in FIG. 3c is substantially convex. Note that in all schematically depicted embodiments in FIGS. 3a-3c, the transmissive windows 300 are substantially flat, however, one or more of those transmissive windows 300 may in alternative embodiments also be substantially convex.

Hence, in the embodiments schematically depicted in FIGS. 3a, 3b, and 3c, at least two luminescent material layers 400(1), 400(2), ... 400(k) may comprise substantially identical luminescent material compositions, but in another embodiment they may comprise substantially different luminescent material compositions. In principle, all k luminescent material layers may be different, but also all or a subset of the luminescent material layers may be identical. The invention is not limited to the specific embodiments depicted in FIGS. 3a, 3b and 3c, or the other Figures.

Figure 4B:
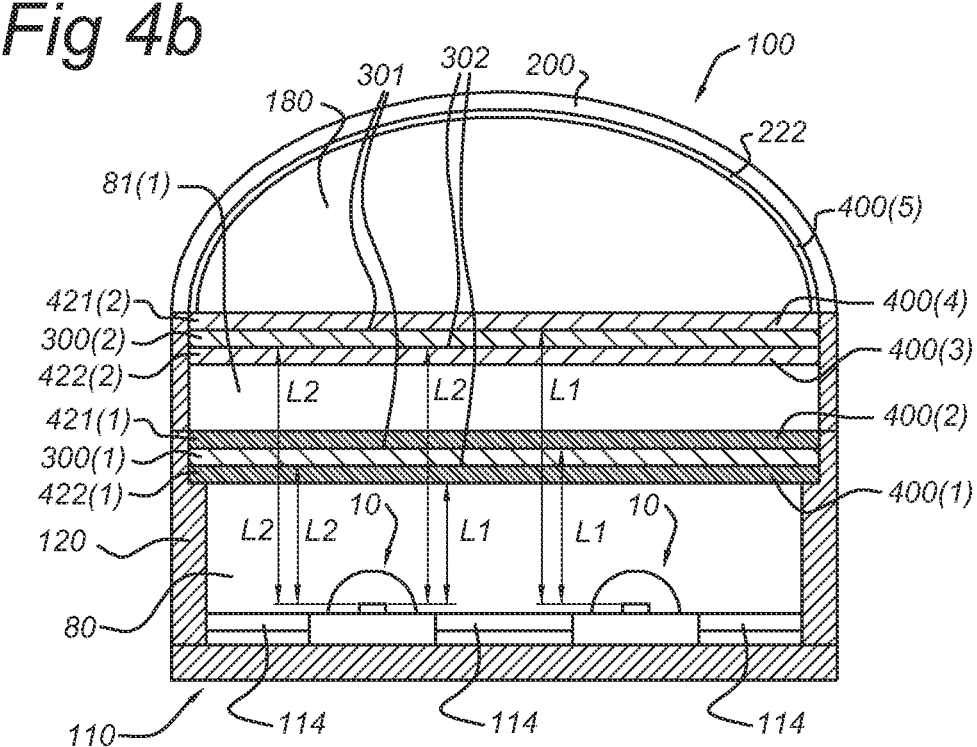
Figure 4C:
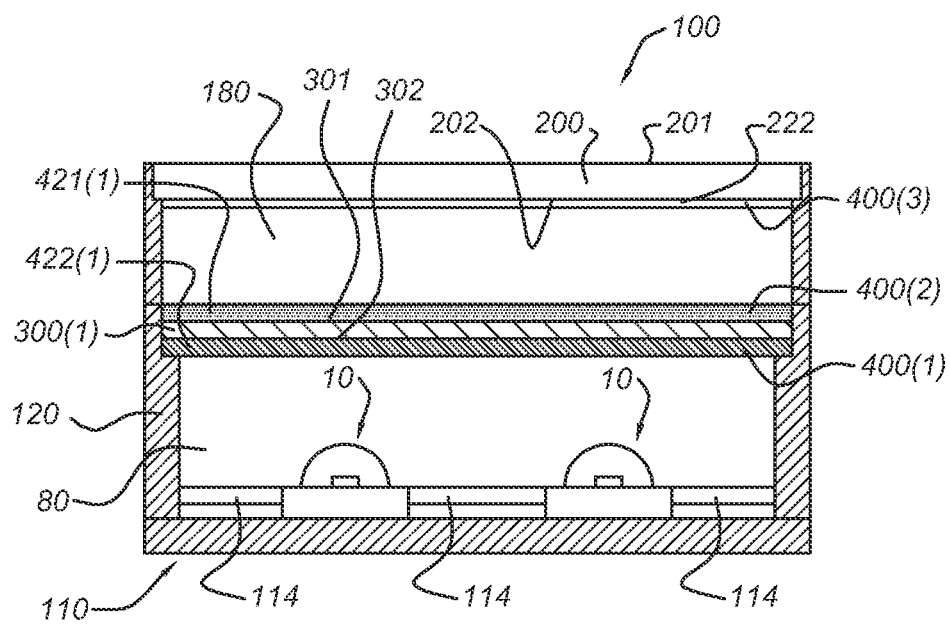

FIGS. 4a, 4b, and 4c schematically depict similar embodiments as described in more detail hereinabove in relation to the schematic drawings. Adjacent chambers 90(1) and 90(2) are not included in the schematic drawings, but may in variants of course be part of the schematically depicted embodiments. For instance, the embodiment schematically depicted in FIGS. 4a and 4c may substantially be the same as the embodiments and variants described in relation to FIGS. 2a, 2b, 2c and 2d; and the embodiment schematically depicted in FIG. 4b may substantially be the same as the embodiments and variants described in relation to FIGS. 3a, 3b and 3c. However, the illumination device 100 according to the embodiments schematically depicted in FIGS. 4a, 4b and 4c comprises a luminescent material upstream exit window coating layer 222, coated onto the upstream exit window face 202.

As mentioned above, such a luminescent material upstream exit window coating layer 222 may also be a luminescent material layer from the group of k luminescent material layers. Hence, the luminescent material upstream exit window coating layer 222 is also indicated as luminescent material layer 400 (in FIG. 4a, this is the third luminescent material layer 400(3), in FIG. 4b this is the fifth luminescent material layer 400(5) and in FIG. 4c this is again the third luminescent material layer 400(3)).

In a specific embodiment, the luminescent material upstream exit window coating layer 222 comprises stress-sensitive luminescent material. Particularly, the luminescent material upstream exit window coating layer 222 comprises a luminescent material arranged to emit red light (since some of the red luminescent materials for excitation by blue light are known to be stress sensitive, such as sulphides, ... ).

Hence, these embodiments may for instance be used for application of the stress-sensitive luminescent material, such as red luminescent materials, on the translucent exit window 200 and for application of the stable yellow and/or green luminescent materials on both sides of the one or more transmissive windows 300 that are mounted in between the LED(s) 10 and the translucent exit window 200. Thanks to the much better heat transfer to ambient at the exit window 200 in combination with the separation of the luminescent materials, the stress-sensitive luminescent material may stay at temperatures only little above the housing temperature. Because the red luminescent material may absorb blue, green, and/or yellow light, the layer thickness can be very thin. This has the advantage that it is hardly or not visible from the outside when in the off-state, and that less luminescent material has to be applied (resulting in lower cost).

FIGS. 5a, 5b, 5c and 5d schematically depict similar embodiments as described in more detail hereinabove in relation to the schematic drawings. Adjacent chambers 90(1) and 90(2) are not included in the schematic drawings, but may in variants of course be part of the schematically depicted embodiments. For instance, the embodiment schematically depicted in FIGS. 5a, 5b, 5c and 5d may substantially be the same as the embodiments and variants described in relation to FIGS. 2a, 2b, 2c and 2d. The embodiments schematically depicted in FIGS. 5a-5d comprise only one transmissive window 300. Note, however, that in variants, these embodiments may also comprise two or more transmissive windows 300.

The illumination device 100 according to the embodiments schematically depicted in FIGS. 5a, 5b, 5c and 5d is further arranged to substantially increase the surface area of one or more of the luminescent materials by applying the luminescent material in reflective mode, particularly by applying the luminescent material in both transmissive and reflective mode. This may be advantageous particularly for stress-sensitive luminescent materials, such as some red luminescent materials or some yellow/green luminescent materials (see above). For instance, the red luminescent material may be applied in reflective mode, for instance on the bottom and/or side reflectors of the LED chamber 80.

For schematic embodiments in drawings 5a and 5b reference is made in particular to the description above in relation to FIG. 4a. Further, in the embodiment schematically depicted in FIGS. 5a and 5b, luminescent material in reflective mode is applied on the substrate 110, more particularly on reflectors 114 (FIG. 5a) and/or on the (reflective) walls 120 of LED chamber 80 (FIG. 5b). Such luminescent material (coating layers) is (are) indicated with reference 500. The luminescent material (also) applied in reflective mode, i.e. luminescent material layer 500, may in particular be stress-sensitive luminescent material. The luminescent material (also) applied in transmissive mode (reference 400) may e.g. comprise yellow luminescent material. The luminescent material (also) applied in transmissive mode on the exit window (222) may e.g. comprise red luminescent material.

In the schematic drawings 5a and 5b, the luminescent material comprised in first and second luminescent material layers 400(1) and 400(2), respectively, may be different from the luminescent material comprised in the third luminescent material layer 400(3). For instance, the first and second luminescent material layers 400(1) and 400(2) may comprise yellow and/or green-emitting luminescent materials, and the third luminescent material layer 400(3) may comprise a stress-sensitive luminescent material. In this way, the red luminescent material is applied on an increased surface area as compared to the surface area of the yellow and/or green luminescent material.

For schematic embodiments in drawings 5c and 5d reference is particularly made to the description above in relation to FIGS. 2b (and 2c). Further, in the embodiments schematically depicted in FIGS. 5c and 5d, luminescent material for reflective mode, i.e. luminescent material layer 500, is applied on the substrate 110, more particularly on reflectors 114 (FIGS. 5c and 5d) (but may of course also or alternatively be applied on the walls 120 of LED chamber 80).

In the schematic drawings 5c and 5d, the luminescent material comprised in first and second luminescent material layers 400(1) and 400(2), respectively, may be different. For instance, the first luminescent material layer 400(1) may comprise yellow and/or green-emitting luminescent materials, and the second luminescent material layer 400(2) may comprise a red luminescent material, and vice versa.

Hence, the invention also provides embodiments of the illumination device 100, further comprising a luminescent material layer 500 arranged to generate emission in a reflective mode. "Reflective mode" in this context relates to arrangements of luminescent material layers 500 such that said layers substantially only emit in a direction away from the side of the coating layer where the luminescent material layer is also irradiated with (LED) radiation. This is particularly in contrast to luminescent material layers 400, which are particularly arranged to emit at least in a direction away from the side of the coating layer facing away from the side where the luminescent material layer is irradiated with (LED) radiation. Further, the luminescent material layers 400 are particularly arranged to transmit at least part of the LED emission 11, whereas for the luminescent material layers 500, in general, it is not required to be arranged to transmit at least part of the LED emission 11.

Figure 6A:
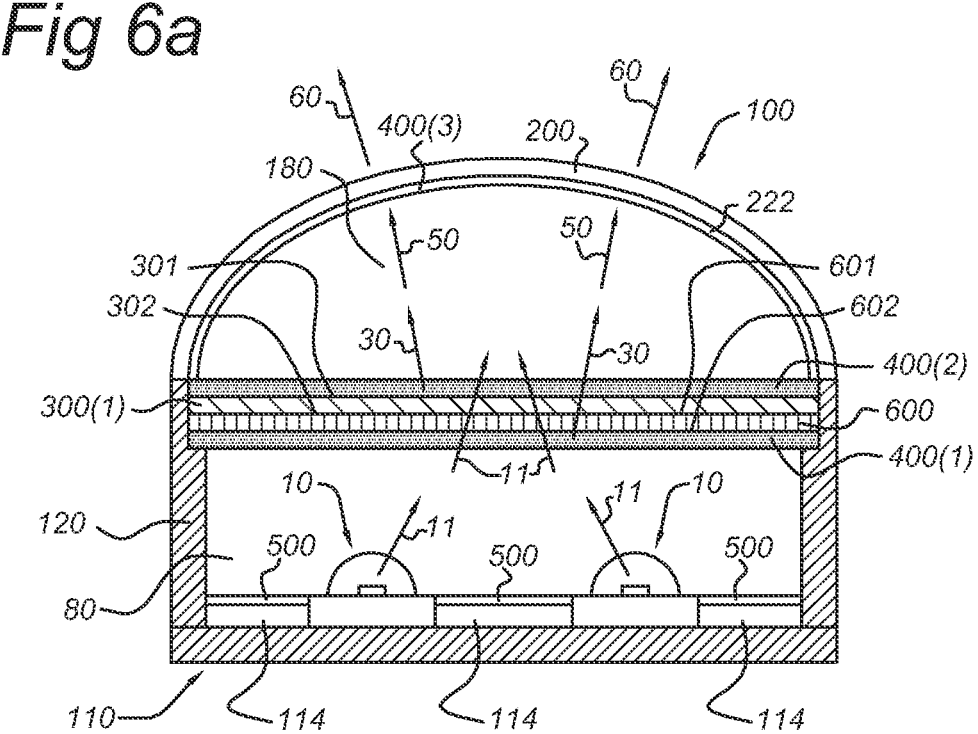
FIGS. 6a and 6b schematically depict some embodiments with dichroic filters.
Figure 6B:
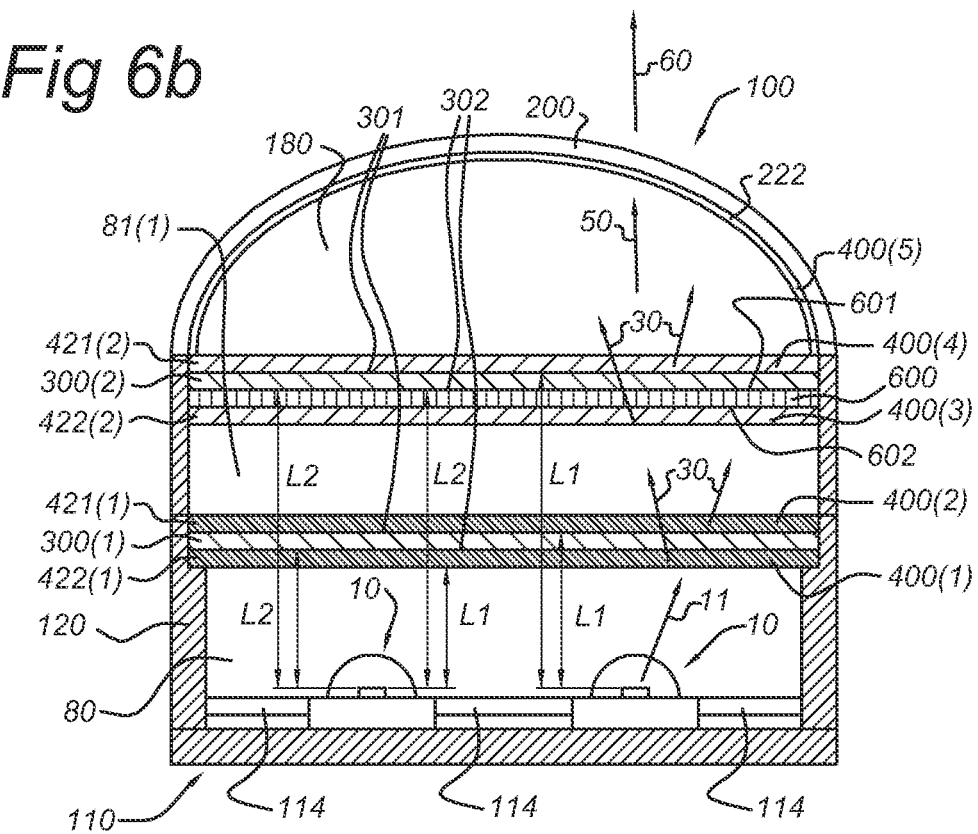

FIGS. 6a and 6b schematically depict embodiments wherein dichroic filters are applied. The term "dichroic filter" is known to the person skilled in the art and refers particularly to optical filters allowing light of a certain color to be (at least partly) transmitted, while light of another color is substantially not transmitted but (at least partly) reflected. In the Figures, the dichroic filter is indicated with reference 600. Note that more than one dichroic filter 600 may be applied.

Figure 5A:
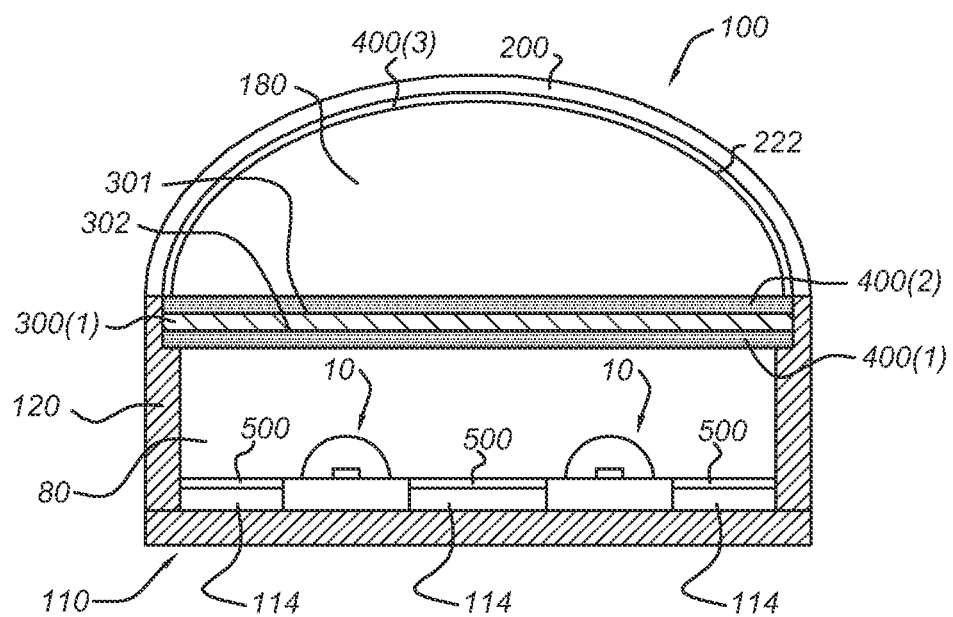
FIGS. 5a-5d schematically depict 4 embodiments, wherein also luminescent material layers in reflective mode are applied.
Figure 5B:
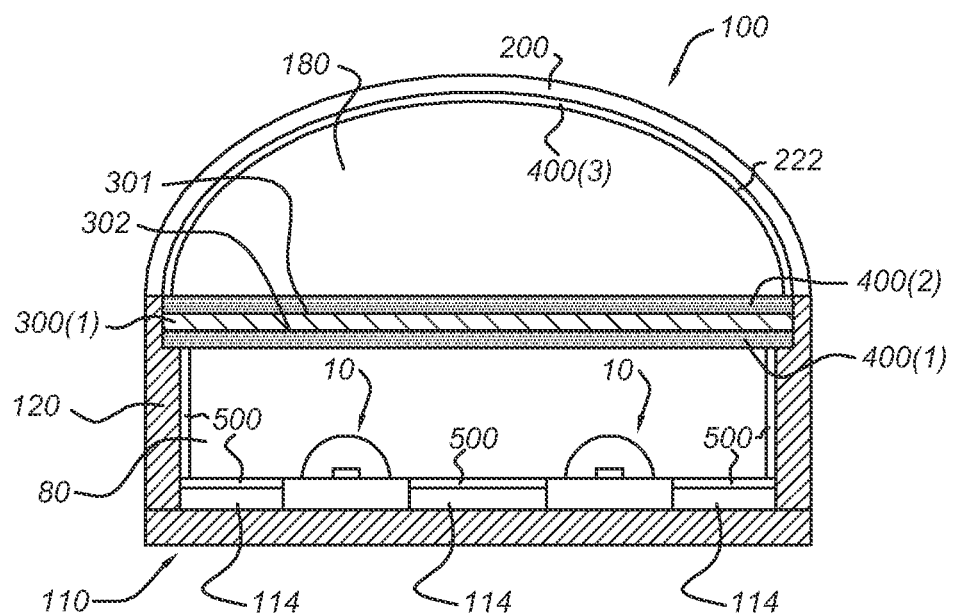
Figure 5C:
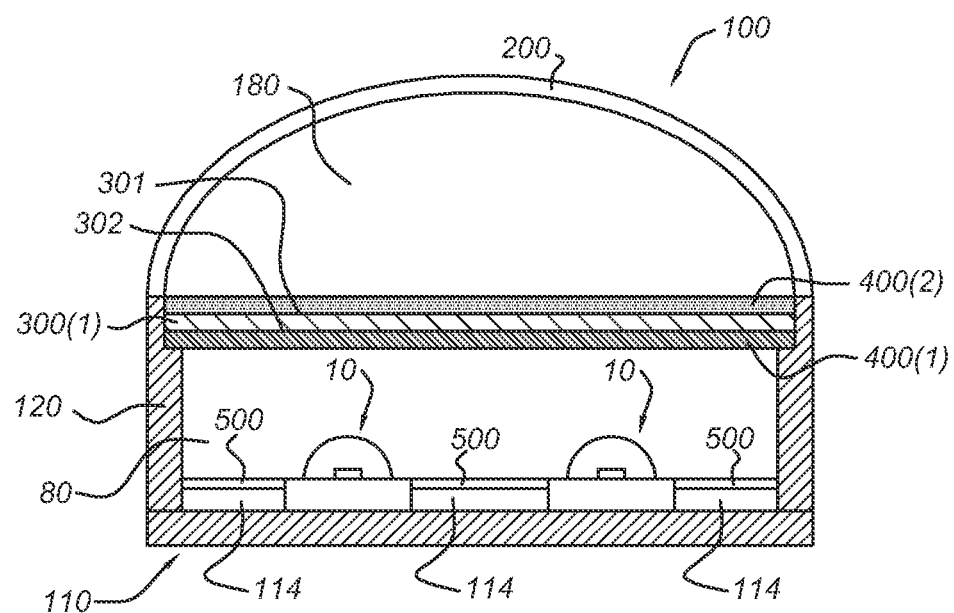
Figure 5D:
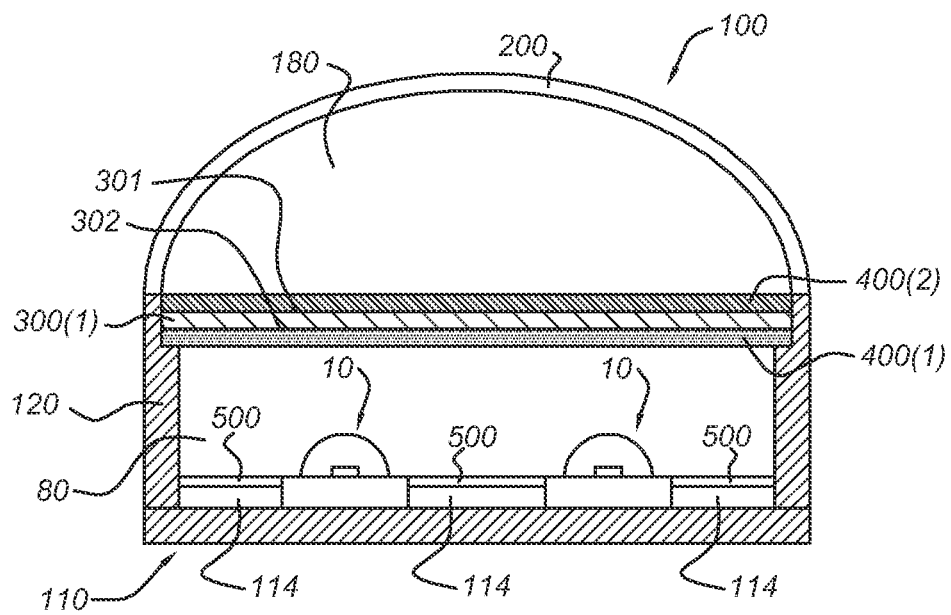

FIG. 6a is substantially the same as FIG. 5a, although the application of dichroic filters 600 is not limited to the specific embodiment schematically depicted in FIG. 6a. FIG. 6b is substantially the same as FIG. 4b, although the application of dichroic filters 600 is not limited to the specific embodiment schematically depicted in FIG. 6b. The dichroic filter 600 has an upstream face 602 and a downstream face 601

The one or more dichroic filters 600 are therefore particularly arranged downstream of the LED 10 and upstream of the translucent exit window 200. Further, such filter(s) is (are) particularly arranged to transmit at least part of the light upstream of the one or more dichroic filters 600 and to reflect at least part of the light downstream of the one or more dichroic filters 600. Referring to FIG. 6a, LED light 11 may be at least partly transmitted, whereas luminescent material luminescence 30 may be at least partly reflected. Likewise, referring to FIG. 6b, at least part of the light upstream of the dichroic filter 600, i.e. light in chamber 81(1), may be transmitted, and at least part of the light generated by the luminescent material coating layers 422(2) and 421(2) may be reflected.

Hence, in a specific embodiment, the emission from layer 400(1) may be transmitted (just as for instance the blue light 11) through the dichroic layer 600, while the emission from layer 400(2) may be reflected by the dichroic layer 600. Similarly, this may apply to other dichroic filters arranged elsewhere in the illumination device 100.

In further alternative embodiments, a dichroic filter is applied between the green-yellow and the red-orange luminescent materials to reflect the green-yellow light, while enabling transmission of both blue and red-orange light.

For instance, the dichroic filter 600 may be arranged between red luminescent material coating layers and green luminescent material coating layers to eliminate luminescent material interaction. The filter reflects the green light, but is transparent to blue and red light. Referring to FIG. 6b, the luminescent material coating layers 422(1) and 421(1) may comprise red luminescent material, and the LED(s) 10 may be arranged to emit blue light, and the luminescent material coating layers 422(2) and 421(2) may comprise red and green luminescent materials, respectively.

In further alternative embodiments, a dichroic filter is applied between the red-orange luminescent material layer and the blue LEDs to transmit only the blue light and reflect the red-orange or red-orange and yellow-green light. Therefore, this filter can simply be a low-pass filter in the wavelength domain. This filter may enhance the overall system efficacy, in particular in those configurations where the LED packing density is relatively high. This is in particular the case for beaming applications like spot lighting.

According to specific embodiments of the invention, the illumination device 100 may comprise one or more luminescent material layers (400(1), 400(2), . . . 400(k)), of which one or more coating layers are independently patterned coating layers.

For instance, the patterned application of a red or orange-emitting luminescent material or of both luminescent material layers may be performed. Due to the small total surface area of the red/orange luminescent material, the interaction with the light emitted by the yellow-green luminescent material may be very limited.

Alternatively, both luminescent materials or luminescent material mixtures are applied in a patterned way on the same side of the film, e.g. as a blocked pattern with typical dimensions between 0.2 and 5 mm or as a dotted pattern with a typical width between 0.2 and 5 mm. For thermo-mechanical stability, a coating layer without luminescent material particles but possibly with scattering particles is applied on the other side. This approach may also lead to reduced luminescent material interaction.

Figure 7A:
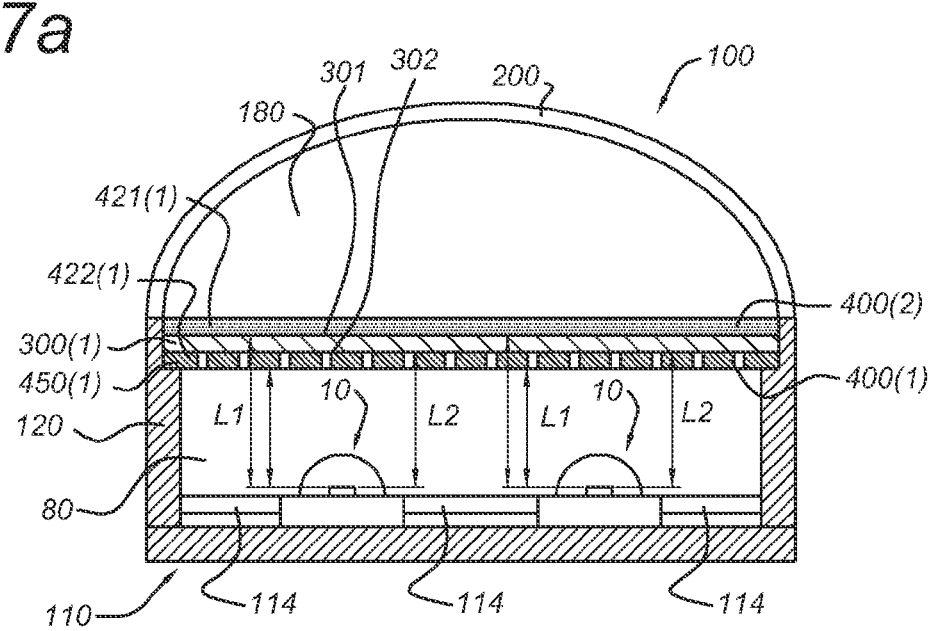
FIGS. 7a and 7b schematically depict some embodiments with patterned luminescent material coating layers.
Figure 7B:
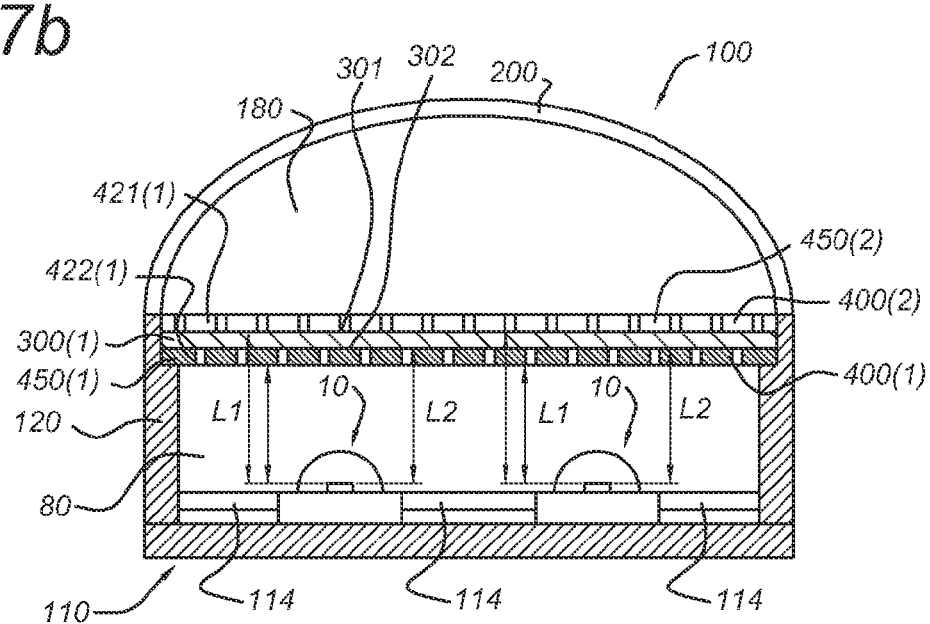

Examples are depicted in FIGS. 7a and 7b. FIG. 7a is substantially the same as FIG. 2a, although the application of patterned layers is not limited to the specific embodiment schematically depicted in FIG. 7a. FIG. 7b is substantially the same as FIG. 4b, although the application of patterned layers 600 is not limited to the specific embodiment schematically depicted in FIG. 7b. In FIG. 7a, an example is given wherein only one of the luminescent material layers 400, particularly one of the luminescent material coating layers, is patterned. This layer is indicated with reference 450(1). In FIG. 7b, two luminescent material layers 400 are patterned: in this schematically depicted embodiment, first luminescent material upstream coating layer 422(1) and first luminescent material downstream coating layer 421(1). The patterned layers are indicated with references 450(1) and 450(2), respectively.

In yet a further embodiment, schematically depicted in FIG. 8, one or more windows selected from the group consisting of the translucent exit window 200 and one or more of the n transmissive windows 300(1), 300(2), . . . 300(n) comprise independently one or more of the luminescent material layers (400(1), 400(2), . . . 400(k)) as translucent luminescent exit window 270 and transmissive luminescent windows 370, respectively.

The embodiment schematically depicted in FIG. 8 is substantially the same as the embodiment schematically depicted in FIG. 3c, with the exception that in FIG. 8 transmissive window 300(1) comprises a luminescent material layer, here luminescent material layer 400(2). The luminescent material may for instance be embedded in the transmissive window, thereby providing a transmissive luminescent window, indicated with reference 370. Further, translucent exit window 200 comprises a luminescent material layer, here luminescent material layer 400(5), thereby providing a translucent luminescent exit window, indicated with reference 270. As will be clear to the person skilled in the art, the application of such windows is not limited to the specific embodiment of FIG. 8, but may also be applied in other embodiments described and depicted herein. In this embodiment, unlike most of the other schematically depicted embodiments, some of the luminescent material layers are adjacent to each other (i.e. substantially not spatially separated), such as layers 400(1) and 400(2). Hence, for transmissive luminescent window 370, distances L1 and L2 may be the same. As will be clear to the person skilled in the art, the illumination device 100 according to the invention may, in embodiments, comprise more than one transmissive luminescent window 370, which may optionally each be independently coated with upstream luminescent material coating layers 422 and/or downstream luminescent material coating layers 421.

In a number of the embodiments schematically depicted hereinabove, the transmissive window 300 and the exit window 200 are depicted as being circular and substantially flat. In particular, if it is assumed that the transmissive window 300 is substantially flat, the transmissive window 300 may be substantially circular, but in another embodiment it may also be square, or may have other shapes known to the person skilled in the art. Likewise, in particular if it is assumed that the exit window 200 is substantially flat, the exit window 200 may be circular or, in another embodiment, square, or it may have other shapes known to the person skilled in the art.

In a number of the embodiments schematically depicted hereinabove, the transmissive window 300 and the exit window 200 are depicted as being circular and substantially convex. In particular, if it is assumed that transmissive window 300 is substantially convex, the transmissive window 300 may be substantially rotationally symmetrical, but in another embodiment it may also be tubular or toroidal, or may have other shapes known to the person skilled in the art. Likewise, in particular if it is assumed that the exit window 200 is substantially convex, the exit window 200 may be substantially rotationally symmetrical or in another embodiment tubular or toroidal, or it may have other shapes known to the person skilled in the art.

The term "substantially" used herein, such as in "substantially all emission" or in "substantially consists", will be understood by the person skilled in the art. The term "substantially" may also include embodiments with "entirely", "completely", "all", etc. Hence, in embodiments the adjective "substantially" may also be removed. Where applicable, the term "substantially" may also relate to 90% or higher, such as 95% or higher, particularly 99% or higher, even more particularly 99.5% or higher, including 100%. The term "comprise" includes also embodiments wherein the term "comprises" means "consists of". The devices referred to herein are, amongst others, described during operation. For instance, the term "blue LED" refers to an LED which during operation thereof generates blue light; in other words: the LED is arranged to emit blue light. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination device, comprising:
a plurality of light emitting diodes (LEDs);
a translucent exit window having an upstream exit window face and a downstream exit window face;
a plurality of transmissive windows separated from each other to create a cavity and arranged downstream of the plurality of LEDs and upstream of the translucent exit window, each transmissive window having an upstream transmissive window face and a downstream transmissive window face; and
two or more luminescent material layers arranged downstream of the plurality of LEDs and upstream of the translucent exit window and spatially separated from the plurality of LEDs, and from each other to create a light chamber in said cavity wherein the plurality of LEDs and the luminescent material layers are arranged to generate light of a predetermined color, and wherein the translucent exit window is arranged to transmit at least part of the light generated thereby.

2. The illumination device according to claim 1, wherein the plurality of transmissive windows comprises a first transmissive window, the upstream transmissive window face thereof comprising a first luminescent material upstream coating layer, and the downstream transmissive window face thereof comprising a first luminescent material downstream coating layer (421(1).

3. The illumination device according to claim 2, wherein the plurality of transmissive windows further comprises a second transmissive window, the upstream transmissive window face thereof comprising a second luminescent material upstream coating layer, and the downstream transmissive window face thereof comprising a second luminescent material downstream coating layer.

4. The illumination device according to claim 1, wherein the upstream exit window face of the translucent exit window comprises a luminescent material upstream exit window coating layer.

5. The illumination device according to claim 4, wherein the luminescent material upstream exit window coating layer comprises a luminescent material arranged to emit red light.

6. The illumination device according to claim 1, wherein at least two luminescent material layers comprise substantially identical luminescent material compositions.

7. The illumination device according to claim 1, wherein at least two luminescent material layers comprise substantially different luminescent material compositions.

8. The illumination device according to claim 1, wherein a first luminescent material layer is arranged to generate light of a first color and a second luminescent material layer is arranged to generate light of a second color, wherein the light of the first color has a dominant emission wavelength larger than the light of the second color, and wherein the first luminescent material layer is arranged upstream of the second luminescent material layer.

9. The illumination device according to claim 8, wherein the first luminescent material layer comprises a luminescent material arranged to emit red light.

10. The illumination device according to claim 1, further comprising an optical sensor arranged to receive substantially only indirect light.

11. The illumination device according to claim 1, further comprising a luminescent material layer arranged to generate emission in a reflective mode.

12. The illumination device according to claim 1, wherein one or more of the luminescent material layers comprise patterned coating layers.

13. The illumination device according to claim 1, further comprising one or more dichroic filters, arranged downstream of the LED and upstream of the translucent exit window, and arranged to transmit at least part of the light upstream of the one or more dichroic filters and to reflect at least part of the light downstream of the one or more dichroic filters.

14. The illumination device according to claim 1, comprising no more than two transmissive windows arranged downstream of the plurality of LEDs and upstream of the translucent exit window, each transmissive window having an upstream transmissive window face and a downstream transmissive window face, and no more than five luminescent material layers arranged downstream of the plurality of LEDs and upstream of the translucent exit window and spatially separated from the plurality of LEDs.

* * * * *